United States Patent
Ramachandran et al.

(10) Patent No.: US 9,883,477 B2
(45) Date of Patent: Jan. 30, 2018

(54) METHOD AND APPARATUS FOR REDUCING SUCCESSIVE PRE-REGISTRATION ATTEMPTS BY ACCESS TERMINALS

(71) Applicant: QUALCOMM Incorporated, San Diego, CA (US)

(72) Inventors: Shyamal Ramachandran, San Diego, CA (US); Thomas Klingenbrunn, San Diego, CA (US); Srinivasan Balasubramanian, San Diego, CA (US); Arvind Swaminathan, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 151 days.

(21) Appl. No.: 14/746,218

(22) Filed: Jun. 22, 2015

(65) Prior Publication Data
US 2015/0296472 A1   Oct. 15, 2015

Related U.S. Application Data

(62) Division of application No. 12/564,415, filed on Sep. 22, 2009, now Pat. No. 9,066,309.
(Continued)

(51) Int. Cl.
*H04W 60/04* (2009.01)
*H04W 60/00* (2009.01)
*H04W 36/00* (2009.01)

(52) U.S. Cl.
CPC ....... *H04W 60/04* (2013.01); *H04W 36/0005* (2013.01); *H04W 60/00* (2013.01)

(58) Field of Classification Search
None
See application file for complete search history.

(56) References Cited

U.S. PATENT DOCUMENTS

| 5,212,822 A | 5/1993 | Fukumine et al. |
| 5,327,574 A | 7/1994 | Monma et al. |

(Continued)

FOREIGN PATENT DOCUMENTS

| CN | 1582050 A | 2/2005 |
| CN | 1886955 A | 12/2006 |

(Continued)

OTHER PUBLICATIONS

European Search Report—EP13185170—Search Authority—The Hague—dated Feb. 10, 2014.
(Continued)

*Primary Examiner* — Chi H Pham
*Assistant Examiner* — Vladislav Agureyev
(74) *Attorney, Agent, or Firm* — Patterson & Sheridan, L.L.P.

(57) ABSTRACT

An access terminal pre-registers with a second access network via a first access network to ensure a quick handover in the future. Frequent pre-registration attempts are avoided by implementing a hysteresis timer that restricts when a pre-registration process can be initiated. The hysteresis timer is started when pre-registration is initiated by the access terminal. No new pre-registration attempts are permitted if the hysteresis timer has not expired. An abort condition can cause the hysteresis timer to be aborted early, and a new pre-registration can be initiated. Access points in the first access network may be grouped into one or more pre-registration zones. If the access terminal moves from a first access point to a second access point, a new pre-registration is skipped if the first and second access points have the same pre-registration zone or the second access point is aware of the pre-registration zone for the first access point.

11 Claims, 18 Drawing Sheets

Related U.S. Application Data

(60) Provisional application No. 61/099,498, filed on Sep. 23, 2008.

(56) References Cited

U.S. PATENT DOCUMENTS

| | | | |
|---|---|---|---|
| 5,950,127 | A | 9/1999 | Nitta et al. |
| 6,832,087 | B2 | 12/2004 | Gwon et al. |
| 6,988,146 | B1 | 1/2006 | Magret et al. |
| 7,480,508 | B2 | 1/2009 | Balachandran et al. |
| 8,019,060 | B2 | 9/2011 | Martino |
| 9,066,309 | B2 | 6/2015 | Ramachandran et al. |
| 2003/0129973 | A1 | 7/2003 | Oishi et al. |
| 2004/0081144 | A1 | 4/2004 | Martin et al. |
| 2005/0111409 | A1* | 5/2005 | Spear ............... H04W 36/12 370/331 |
| 2006/0099946 | A1 | 5/2006 | Burgess et al. |
| 2006/0140150 | A1 | 6/2006 | Olvera-Hernandez et al. |
| 2006/0155878 | A1 | 7/2006 | Narayanan et al. |
| 2007/0213049 | A1 | 9/2007 | Bishop |
| 2007/0218919 | A1 | 9/2007 | Ozulkulu et al. |
| 2007/0298797 | A1 | 12/2007 | Jiao et al. |
| 2008/0096585 | A1 | 4/2008 | Willey |
| 2008/0123529 | A1 | 5/2008 | Lee et al. |
| 2008/0151843 | A1* | 6/2008 | Valmikam ........... H04W 64/003 370/338 |
| 2008/0233963 | A1 | 9/2008 | Alanara et al. |
| 2008/0259876 | A1* | 10/2008 | Qiang ............... H04W 36/0066 370/332 |
| 2009/0207805 | A1* | 8/2009 | Zou ..................... H04W 60/04 370/331 |
| 2009/0270105 | A1 | 10/2009 | Kakumaru |
| 2010/0075680 | A1 | 3/2010 | Ramachandran et al. |
| 2010/0272060 | A1 | 10/2010 | Junela et al. |
| 2010/0284370 | A1* | 11/2010 | Samar ............... H04W 36/0016 370/331 |

FOREIGN PATENT DOCUMENTS

| | | |
|---|---|---|
| CN | 101026874 A | 8/2007 |
| EP | 1278387 A2 | 1/2003 |
| EP | 1662726 | 5/2006 |
| GB | 2446193 | 8/2008 |
| JP | 3080790 A | 4/1991 |
| JP | 9121376 A | 5/1997 |
| JP | 2006141026 A | 6/2006 |
| JP | 2006246125 A | 9/2006 |
| JP | 2008011573 A | 1/2008 |
| JP | 2008098880 A | 4/2008 |
| JP | 2010515296 A | 5/2010 |
| WO | WO-9956476 A1 | 11/1999 |
| WO | WO-2004028180 A1 | 4/2004 |
| WO | WO-2005053256 A1 | 6/2005 |
| WO | WO-2008047124 A1 | 4/2008 |
| WO | WO-2008079804 A1 | 7/2008 |

OTHER PUBLICATIONS

International Search Report—PCT/US2009/058112—International Search Authority, European Patent Office, dated Jun. 28, 2010.
Partial European Search Report—EP13185170—Search Authority—The Hague—dated Nov. 13, 2013.
Written Opinion—PCT/US2009/058112—ISA/EPO—dated Jun. 28, 2010.

\* cited by examiner

METHOD AND APPARATUS FOR REDUCING SUCCESSIVE PRE-REGISTRATION ATTEMPTS BY ACCESS TERMINALS

CLAIM OF PRIORITY

The present application is a divisional application of U.S. application Ser. No. 12/564,415, entitled "METHOD AND APPARATUS FOR REDUCING SUCCESSIVE PRE-REGISTRATION ATTEMPTS BY ACCESS TERMINALS," filed Sep. 22, 2009, assigned U.S. Pat. No. 9,066,309 with an issue date of Jun. 23, 2015, which claims priority to U.S. Provisional Application No. 61/099,498, filed Sep. 23, 2008, both assigned to the assignee hereof and hereby expressly incorporated by reference herein.

FIELD

One feature relates to facilitating wireless communication handoffs from a first network to a second network by allowing pre-registration in the second network while operating in the first network. More particularly, at least one feature relates to minimizing pre-registration attempts by utilizing a hysteresis timer to restrict when pre-registration can be initiated, thereby conserving power resources of the access terminal. Additionally, access points in the first network may be associated with a pre-registration zone and/or a secondary pre-registration zone list to more intelligently determine when pre-registration can be skipped or avoided when switching from a first access point to a second access point in the first access network.

BACKGROUND

Competing wireless communication networks often implement different communication standards. In some instances, even a core network may implement different wireless communication technologies and/or standards in different zones or regions. Since wireless access terminals are highly mobile, they tend to travel through zones or regions served by different wireless communication networks and/or implementing different communication technologies and/or standards. In some cases, a wireless access terminal that typically communicates over networks using a first communication standard may enter a region being served by a wireless communication network that operates on a different second communication standard. The access terminal may include dual mode or multi mode communication capabilities that allow it to switch between different communications systems that implement different protocols or standards. This allows the wireless access terminal that normally operates on a first type of network (e.g., using a first communication standard) to operate on a second type of network (e.g., using a second communication standard). For example, the access terminal may include two or more communication modules to allow it to communicate over different types of networks, e.g., a 3GPP2 Evolved High Rate Packet Data (eHRPD) network and a 3GPP Evolved Universal Terrestrial Radio Access (E-UTRA) (also known as Long Term Evolution (LTE)). As the access terminal enters a new region or zone that implements a different communication protocol or standard, it switches to operate on a communication module compatible with the communication protocol or standard for the new region or zone. Note that eHRPD may be supported in the CDMA 2000 standard.

For ease of transportation and/or use, access terminals are increasingly smaller with greater processing resources. However, due to their mobility and size, access terminals tend to powered by power sources (e.g., batteries, power cells, power supplies, rechargeable battery packs, etc.) of limited size and/or energy storage. Consequently, the operation of the access terminal, including its dual mode or multi mode capabilities, may be closely monitored in order to extend the operating time of the access terminal between recharging of the power source.

Therefore, a method is needed to allow an access terminal to switch between different types of communication networks while conserving limited power resources.

SUMMARY

One feature provides an access terminal, and/or method operational therein, that is configured to avoid unnecessary pre-registration attempts. The access terminal may include a wireless communication interface coupled to a processing circuit. The wireless communication interface may provide multi-mode capabilities to communicate over a first access network and a second access network. The wireless communication interface may communicate with just one of the first access network and the second access network at any one time. The processing circuit may be adapted to (a) start a timer after a pre-registration with the second access network is performed by the access terminal via the first access network, (b) prevent additional pre-registrations with the second access network prior to expiration of the timer unless an abort condition occurs, and/or (b) perform a second pre-registration prior to the expiration of the timer if an abort condition occurs. The abort condition may occur, for example, (a) when a serving cell signal quality falls below a signal quality threshold and/or (b) when an indication of an impending handoff from the first access network to the second access network is obtained. The timer may have a fixed duration so as to extend the time between pre-registration attempts by the access terminal. In one example, the timer may be a hysteresis timer.

The processing circuit may be further adapted to determine whether the first access network allows pre-registration with the second access network. For instance, a pre-registration indicator and a first pre-registration zone identifier may be received by the access terminal from a serving first access point of the first access network. The pre-registration indicator may be used to determine whether the first access network allows pre-registration with the second access network. The access terminal may store the received first pre-registration zone associated with the first access point. Additionally, the access terminal may also receive a secondary pre-registration zone list associated with the first pre-registration zone. As the access terminal moves from the first serving access point to a second serving access point within the first access network, the processing circuit may (a) obtain a second pre-registration zone for the second serving access point, (b) compare the second pre-registration zone to the first pre-registration zone, and/or (c) prevent a new pre-registration if the first pre-registration zone and the second pre-registration zone are the same. Additionally, the access terminal may also (a) obtain a secondary pre-registration zone list for the second serving access point, (b) compare the first pre-registration zone to one or more zones in the secondary pre-registration zone list; and/or (c) prevent a new pre-registration if the first pre-registration zone is found in the secondary pre-registration zone list. A new pre-registration with the second access network may be performed via the second serving access point of the first access network if the first pre-registration zone is distinct from the second pre-registration zone and the zones in the secondary pre-registration zone list. Note that the first access network and second access network are distinct wireless networks. In one example, the first access network is a Long Term Evolution network and the second access network is an Evolved High Rate Packet Data network. Pre-registration may include exchanging one or more messages with the second access network through a communication tunnel via the first access network. Pre-registration of the access terminal with the second access network permits a subsequent communication handoff between the first access network and the second access network without delay.

Another feature provides an access point, and/or method operational therein, that is configured to help avoid unnecessary pre-registration attempts by an access terminal. The access point may include a wireless network interface, a network interface, and/or a processing circuit. The wireless network interface may serve to communicate with access terminals in a cell within a first access network. The network interface may serve to communicate with a second access network. The processing circuit may be coupled to the wireless network interface and the network interface. The processing circuit may be adapted to (a) obtain a first pre-registration zone identifier, where the pre-registration zone identifier identifies a group of access points within the first access network, (b) obtain a secondary pre-registration zone list that includes zone identifiers associated with the first pre-registration zone identifier, and/or (c) advertise the first pre-registration zone identifier and the secondary pre-registration zone list to one or more access terminals in a cell covered by the access point. Additionally, the processing circuit may be further adapted to (a) obtain a pre-registration indicator from the first access network, (b) receive a pre-registration request with a second access network from an access terminal operating within a cell covered by the access point, and/or (c) route the pre-registration request to the second access network if the pre-registration indicator indicates that such pre-registration is allowed. The first pre-registration zone identifier and the secondary pre-registration zone list is utilized by receiving access terminals in a cell covered by the access point to determine whether a new pre-registration is needed with a second access network via the access point of the first access network.

Another feature provides a network server of a first access network, and/or method operational therein, that is configured to help avoid unnecessary pre-registration attempts by an access terminal. The network server may include an intra-network interface, an inter-network interface, and/or a processing circuit coupled to the intra-network interface and the inter-network interface. The intra-network interface may serve to communicate with access points within a first access network. The inter-network interface may serve to communicate with a second access network. The processing circuit may be adapted to (a) group a plurality of cells in a first access network into one or more cell groups, (b) associate a first cell group with a first pre-registration zone, (c) generate a secondary zone list for the first pre-registration zone, where the secondary zone list excludes the first pre-registration zone, and/or (d) distribute the first pre-registration zone and the secondary zone list to access points within the cells for the first cell group. The first pre-registration zone and the secondary zone list is utilized by receiving access terminals to determine whether a new pre-registration is needed with the second access network via the first access network. The network server may also (a) distribute the pre-registration indicator; and/or (b) generate a pre-registration indicator based on whether the first access network allows access terminals to pre-register with a second access network via the first access network.

Yet another feature provides a method for deploying access points and pre-registration zones within a first access network. A first pre-registration zone identifier is assigned to a first group of access points. A second pre-registration zone identifier is assigned to a second group of access points. A third pre-registration zone identifier is assigned to a third group of access points. The first pre-registration zone identifier is advertised from or by the first group of access points. The second pre-registration zone identifier is advertised from or by the second group of access points. The third group of access points is deployed to form a boundary zone between the first group of access points and the second group of access points. The third pre-registration zone identifier is advertised from or by the third group of access points. The first pre-registration zone identifier and second pre-registration zone identifier in a secondary pre-registration zone list are advertised from or by the third group of access points. Note that the secondary pre-registration zone list excludes the third pre-registration zone identifier. In one implementation, the first pre-registration zone identifier, first pre-registration zone identifier, and the third pre-registration zone identifier may be the same zone identifier.

DETAILED DESCRIPTION

In the following description, specific details are given to provide a thorough understanding of the embodiments. However, it will be understood by one of ordinary skill in the art that the embodiments may be practiced without these specific details. For example, circuits may be shown in block diagrams, or not be shown at all, in order not to obscure the embodiments in unnecessary detail. In other instances, well-known circuits, structures and techniques may not be shown in detail in order not to obscure the embodiments.

Overview

One feature relates to an access terminal configured to conserve power by avoiding unnecessary network pre-registration operations. In one example, the access terminal may be adapted to operate in at least a first access network and a second access network. In order to smoothly handover communications or service from the first access network (e.g., LTE network) to the second access network (e.g., eHRPD network), the access terminal may pre-register with the second access network. This pre-registration process involves one or more wireless transmissions and may be repeated multiple times depending on the movement of the access terminal through regions or cells covered by different networks and/or access points within a particular network. Unnecessary or frequent pre-registration processes can consume significant power resources for the access terminal. The access terminal may avoid such frequent and/or unnecessary pre-registration attempts by implementing a hysteresis timer that restricts when a pre-registration process can be initiated. The hysteresis timer has a fixed duration and is started when pre-registration is initiated by the access terminal No new pre-registration attempts are permitted if the hysteresis timer has not expired. However, an abort event or condition can cause the hysteresis timer to be aborted early, and a new pre-registration can be initiated by the access terminal.

Another feature provides various deployment methods that minimize or eliminate the need to perform frequent or successive pre-registrations by an access terminal. Specifically, access points in the first access network are grouped into one or more pre-registration zones. If the access terminal moves from a first access point to a second access point within the first access network, a new pre-registration is skipped or avoided if the first and second access points have the same pre-registration zone or if the second access point is aware of the pre-registration zone for the first access point through a secondary pre-registration zone list.

Exemplary Network Environment

Figure 1:
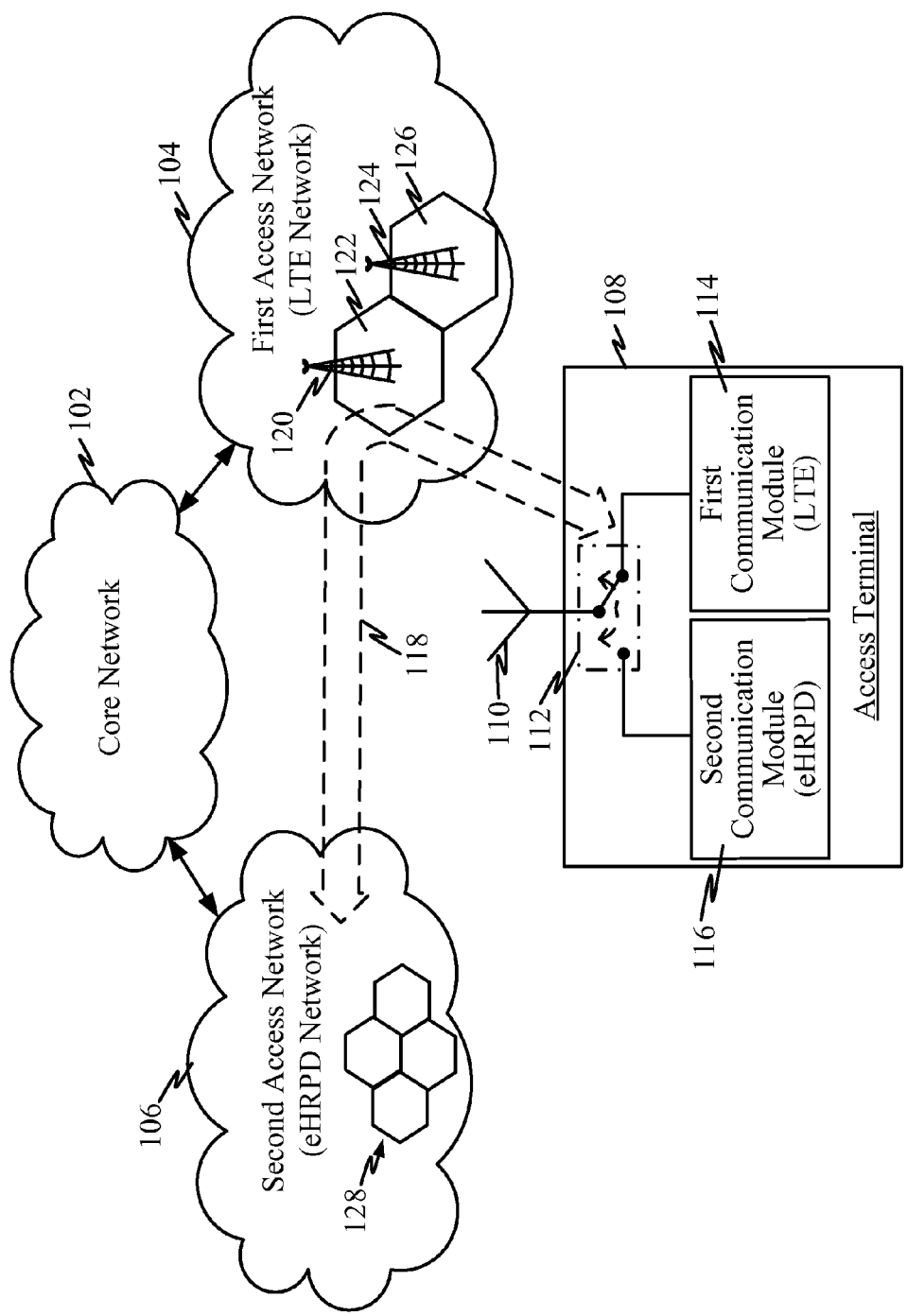
FIG. 1 is a block diagram illustrating an example of a network environment in which a dual mode or multi mode access terminal may operate.

FIG. 1 is a block diagram illustrating an example of a network environment in which a dual mode or multi mode access terminal may operate. The network environment may include a core network 102 that couples and/or facilitates communications between a first access network 104 (e.g., a LTE network) to a second access network 106 (e.g., an eHRPD network). The core network 102 may simply be a gateway or a network infrastructure that routes communications between the first network 104 and the second network 106. The first network 104 and second network 106 may be distinct networks that implement different communication protocols and/or standards.

In this example, an access terminal 108 is receiving wireless communication service from the first access network 104 via an antenna 110. The access terminal 108 may be a multi mode access terminal that includes a first communication module 114 (e.g., an LTE communication module) and a second communication module 116 (e.g., an eHRPD communication module). Note that the access terminal 108 may include additional communication modules compliant with different communication protocols and/or standards. A switch 112 may be configured to couple the antenna 110 to a selected communication module.

In order to facilitate the smooth handover of services between the first access network 104 to the second access network 106, the access terminal 108 may be adapted to pre-register with the second access network 106 while it is still communicating via the first access network 104. That is, instead of waiting until the access terminal 108 comes within reach of the second access network 106, it pre-registers with the second access network 106 to make any future transition transparent, with minimal interruption, and/or without interruption of service to access terminal 108.

In one example where the second access network 106 is an eHRPD network, the process of registering with the second access network 106 involves the exchange of several messages between the access terminal 108 and the eHRPD network while the access terminal 108 is still connected to the first access network 104 (e.g., via the first communication module 114 or LTE module). Note that eHRPD network may share the same core network 102 as EUTRAN or LTE networks 104 and this core network 102 may be called the Enhanced Packet Core (EPC).

This exchange of messages may take several seconds. In order to enable faster handoffs between the first access networks 104 and the second access network 106, the access terminal 108 registers with the second access network 106 while being coupled (e.g., over the air) to the first access network 104. This procedure of registering with the second access network 106 prior to actually connecting to the second access network 106 over the air is termed "pre-registration." In one example, pre-registration may be done over a pre-registration communication tunnel 118 from the access terminal 108 via the first access network 104 and to/from the second access network 106. Pre-registration eliminates the need for performing registration procedures including session establishment, IP context creation and authentication soon after handoff or on-the-fly, thereby minimizing service interruption and improving user experience.

In one implementation, pre-registration by the access terminal 108 operating in the first access network (e.g., LTE network) may be governed by pre-registration zones advertised by a serving access point (e.g., base station, etc.) in the first access network 104. In some implementations, a pre-registration zone may correspond to cell or groups of cells in the first access network or the second access networks. For instance, a pre-registration zone may correspond to any logical or geographical collection of one or more radio access networks or groups of cells within such networks. In one example, the pre-registration zone advertised by the serving access point (e.g., LTE base station) in the first access network 104 may correspond to a group of one or more access points 128 (e.g., base stations) in the second access network 106 (e.g., eHRPD network). Such collection of access points 128 (e.g., eHRPD base stations) may be called a subnet (e.g., eHRPD subnet).

In some instances, the access terminal 108 may travel or switch service between a first access point 120 covering a first region 122 and a neighboring second access point 124 covering a second region 126 of the first access network 104. However, the first access point 120 and second access point 124 may be advertising different pre-registration zones. Consequently, as the access terminal 108 switches back and forth between the first and second access points 120 and 124 (e.g., either due to bad cell-parameter configuration, rapidly changing radio conditions, or trajectory/movement of the access terminal), the access terminal may make multiple successive pre-registration attempts. Since the pre-registration procedure may potentially involve exchanging several messages between the access terminal 108 and the second access network 106, performing multiple pre-registration attempts in quick succession can prove very expensive in terms of power consumption, as well as, over-the-air radio resource consumption. However, the access terminal 108 may be configured to address this problem by reducing or preventing multiple pre-registration attempts in quick succession.

The access terminal 108 may determine when to initiate the pre-registration process based on several factors or information. For instance, the access terminal 108, operating in the first access network 104, may learn, obtain, and/or receive the following information from its serving access point 120 or 124:

a "pre-registration indicator" which indicates whether pre-registration with the second access network 106 is allowed through the serving first access network 104,
a current "pre-registration zone", and
a "secondary pre-registration zone list".

The access terminal 108 may utilize the pre-registration indicator, pre-registration zone, and/or the secondary pre-registration zone list to determine whether the pre-registration process should be initiated.

If the access terminal 108 has never pre-registered with the second access network 106, it performs pre-registration if it learns that the serving first access network 104 allows pre-registration with the second access network 106.

If this access terminal 108 has pre-registered with the second access network 106, it recalls the pre-registration zone in which it previously performed the pre-registration and compares it against the "pre-registration zone" and the "secondary pre-registration zone list" advertised by the currently serving access point 120 or 124 in the first access network 104. If the pre-registration zone in which the access terminal 108 had previously pre-registered matches either the "pre-registration zone" or one of the zones listed in the "secondary pre-registration zone list" advertised by the serving access point 120 or 124, the access terminal 108 does not perform pre-registration again. If no match is found in either the "pre-registration zone" or the "secondary pre-registration zone list", the access terminal 108 performs pre-registration again.

Figure 2:
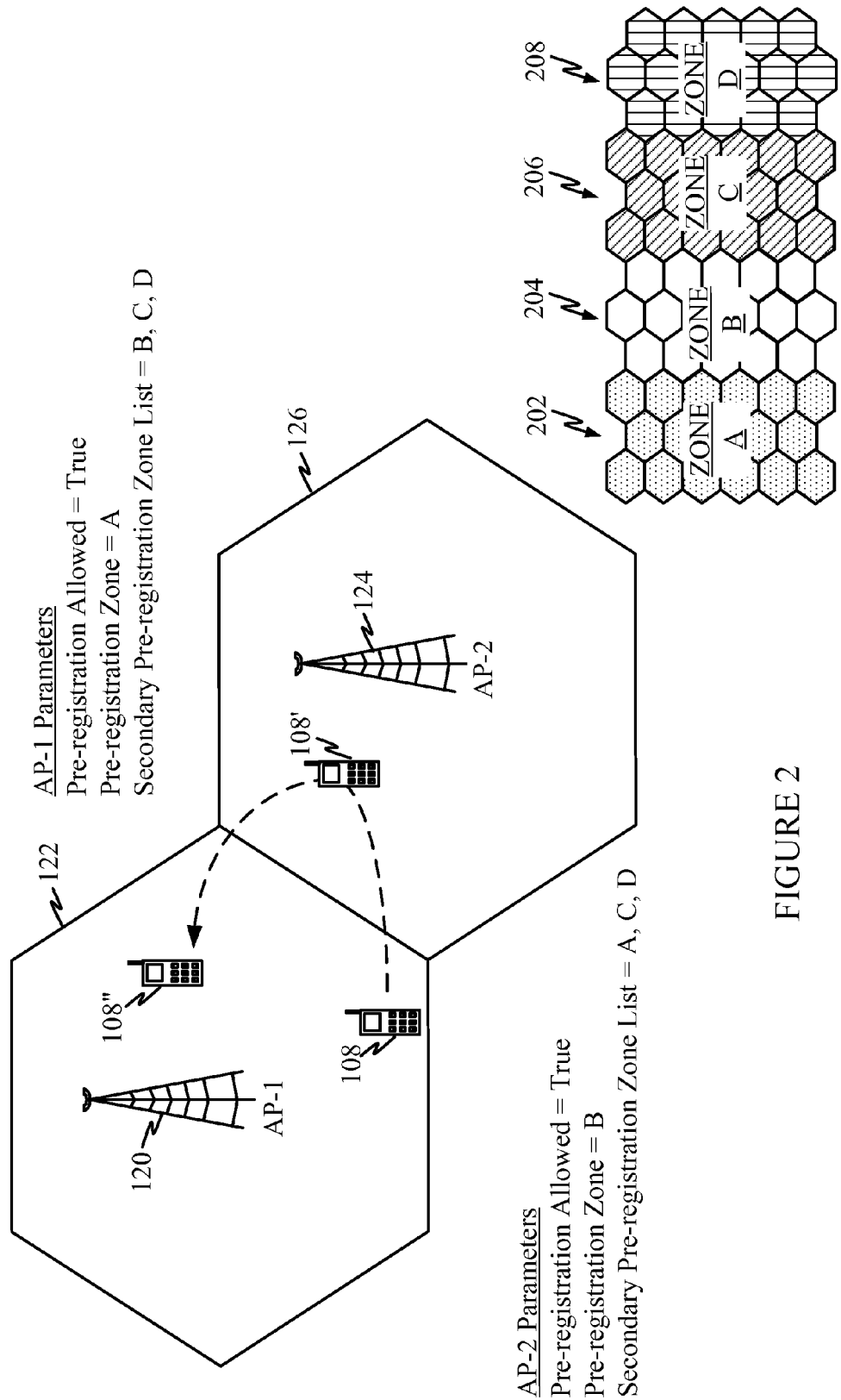
FIG. 2 is a block diagram illustrating a first example of a pre-registration scenario by an access terminal.

FIG. 2 is a block diagram illustrating a first example of a pre-registration scenario by an access terminal. For purposes of illustration, this example uses the access terminal 108 and access points 120 and 124 of the first access network 104 of FIG. 1. Additionally, this example illustrates how network cells may be logically grouped into Zones A 202, B 204, C 206, and D 208. Note that FIGS. 10-13 illustrate various other examples of how zones may be defined. Initially, the access terminal 108 may power up in the first region or cell 122 which is covered by the first access point AP-1 120. By communicating with the first access point AP-1 120, the first access terminal 108 determines that pre-registration is allowed. Therefore the access terminal 108 pre-registers with the second access network 106 (in FIG. 1) and stores the pre-registration zone, which is Zone A in this example for access point AP-1 120. The access terminal 108 then moves to the second region or cell 126 which is covered by the second access point AP-2 124. The access terminal 108' determines that pre-registration is allowed by the second access point AP-2 124. Since the access terminal 108' has pre-registered before, it recalls where it had previously performed pre-registration, Zone A in this example. The access terminal 108' then compares the previous zone, i.e., Zone A, with the pre-registration zone (i.e., Zone B) and the secondary pre-registration zone list (Zones A, C, and D) advertised by the second access point AP-2 124. In this example, the pre-registration zone (Zone A) where the access terminal 108' had previously performed its pre-registration is different than the new pre-registration zone (Zone B). Therefore, the access terminal 108' then checks whether the previous pre-registration zone (Zone A) matches one of the zones listed in the secondary pre-registration zone list (Zones A, C, and D) for the second access point AP-2 124. In this example, the previous pre-registration zone (Zone A) is found in the secondary pre-registration zone list, therefore access terminal does not repeat the pre-registration process.

The access terminal 108' may subsequently move back into the first region or cell 122 where it determines that its last pre-registered zone (Zone A) matches the advertised pre-registration zone (Zone A). Therefore, the access terminal 108" does not need to perform pre-registration again.

Figure 3:
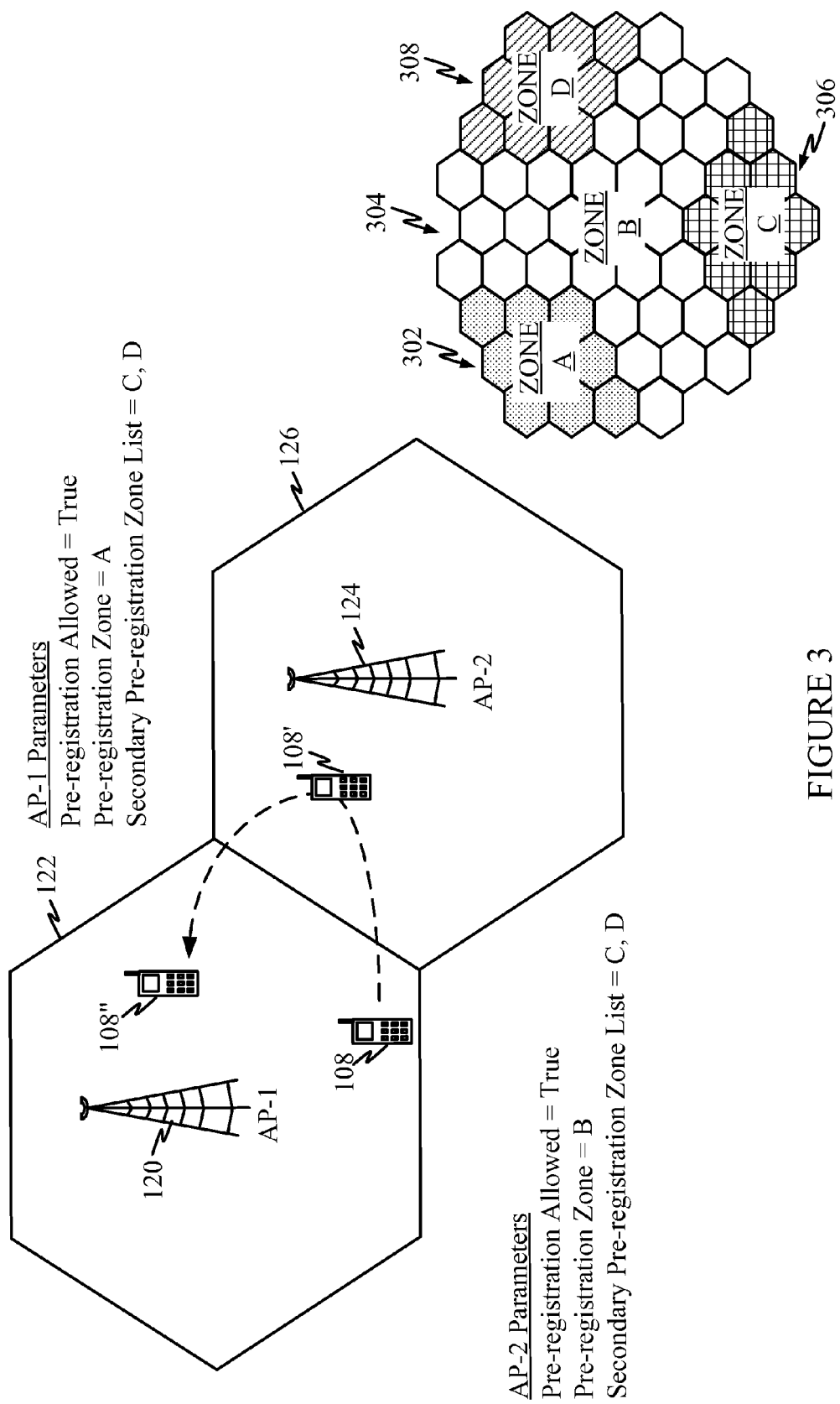
FIG. 3 is a block diagram illustrating a second example of a pre-registration scenario by an access terminal.

FIG. 3 is a block diagram illustrating a second example of a pre-registration scenario by an access terminal. For purposes of illustration, this example uses the access terminal 108 and access points 120 and 124 of the first access network 104 of FIG. 1. Additionally, this example illustrates how network cells may be logically grouped into Zones A 302, B 304, C 306, and D 308. Note that FIGS. 10-13 illustrate various other examples of how zones may be defined. Initially, the access terminal 108 may power up in the first region or cell 122 which is covered by the first access point AP-1 120. Since the first access point AP-1 120 permits pre-registration, the access terminal 108 pre-registers with the second access network 106 (in FIG. 1) and stores the pre-registration zone, which is Zone A in this example for access point AP-1 120. The access terminal 108 then moves to the second region or cell 126 which is covered by the second access point AP-2 124. The access terminal 108' determines that pre-registration is allowed by the second access point AP-2 124. Since the access terminal 108' has pre-registered before, it recalls where it had previously performed pre-registration, Zone A in this example. While in the second region or cell 126, the access terminal 108 learns that pre-registration is permitted by the second access point AP-2 124. Since the access terminal 108' has pre-registered before, it recalls where it had performed pre-registration, Zone A in this example. The access terminal 108' then compares this previous pre-registration zone (Zone A) with the pre-registration zone (Zone B) and the secondary pre-registration zone list (Zones C, D) advertised by the second access point AP-2 124. Since the pre-registration zone (Zone A) where the access terminal 108' had previously performed pre-registration does not match either the new pre-registration zone (Zone B) nor any of the zones listed in the secondary pre-registration zone list (Zones C, D), the access terminal 108' repeats pre-registration again. The access terminal 108' updates its last pre-registered zone to Zone B. The access terminal 108' may subsequently move back into the first region or cell 122 where it realizes that its last pre-registered zone (Zone B) does not match either the advertised pre-registration zone (Zone A) nor any of the zones listed in the secondary pre-registration zone list (Zones C, D). Therefore the access terminal 108" performs pre-registration again via the first access point AP-1 120.

Whenever the access terminal crosses boundaries between regions or cells (such as those illustrated in FIG. 3) Error! Reference source not found., it performs multiple pre-registrations, potentially in quick succession. This can result in unnecessary power consumption/battery drainage and over-the-air resource wastage.

To avoid multiple pre-registrations in quick succession, the access terminal 108 may be adapted to use a timer that restricts when a new pre-registration request can be initiated or sent by the access terminal.

Exemplary Pre-Registration Hysteresis Timer

Figure 4:
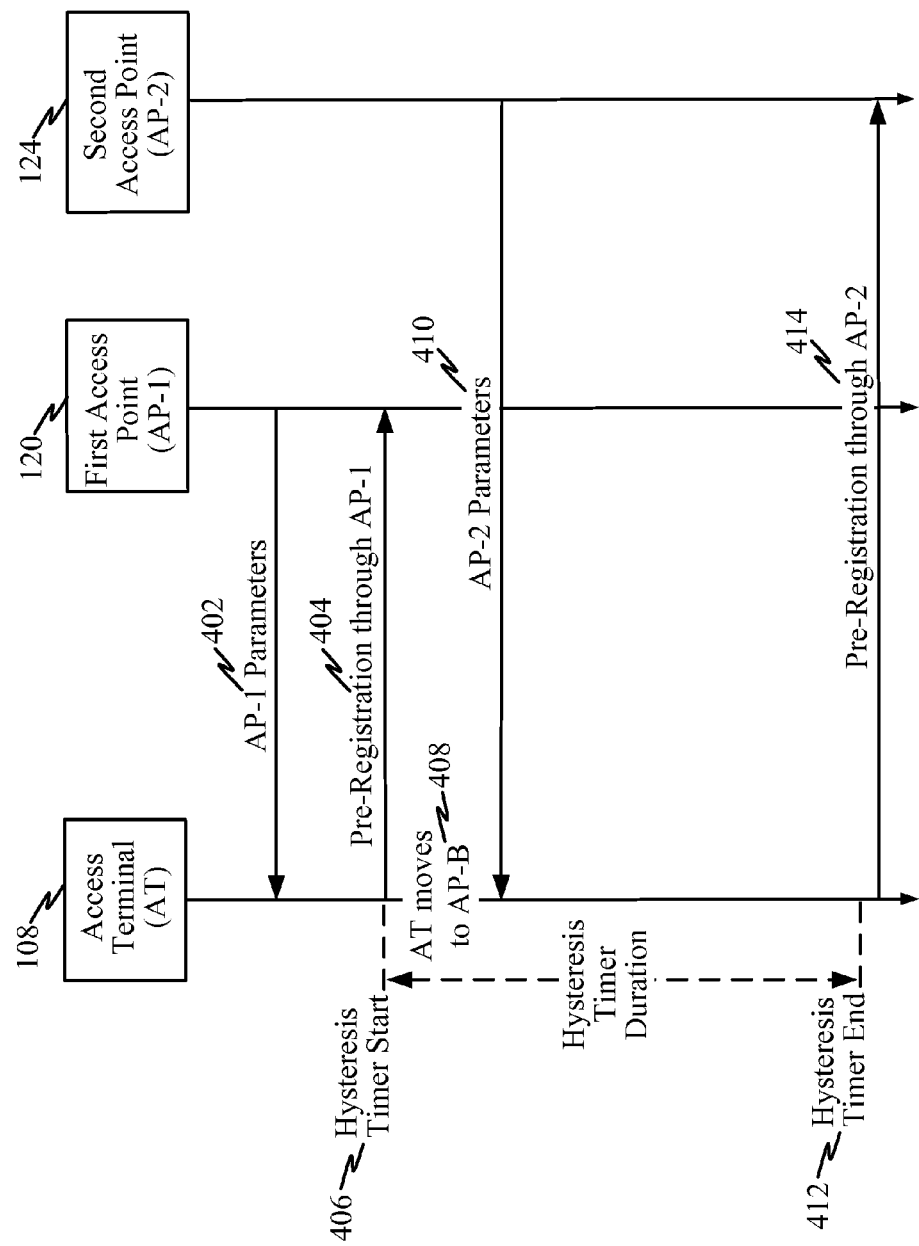
FIG. 4 illustrates a first example of how an access terminal may use a timer to restrict how often or frequently it may initiate a pre-registration process.

FIG. 4 illustrates a first example of how an access terminal may use a timer to restrict how often or frequently it may initiate a pre-registration process. For purposes of illustration, this example uses the access terminal 108 and access points 120 and 124 of the first access network 104 of FIG. 1. While operating within a first region or cell covered by the first access point AP-1 120 of a first access network 104 (FIG. 1), the access terminal 108 may receive parameters 402 for the first access point AP-1 120. These parameters 402 may include (a) an indicator of whether pre-registration is allowed by the first access point AP-1 120 or the first access network, (b) a pre-registration zone, and/or (c) a secondary pre-registration zone list. Upon determining that pre-registration is allowed, the access terminal 108 may initiate pre-registration 404 through the first access point AP-1 120. Concurrent with the pre-registration 404, the access terminal 108 also starts a hysteresis timer 406. Such timer may be started each time the access terminal 108 performs pre-registration with a second access network. A second pre-registration is not initiated or performed by the access terminal 108 until the hysteresis timer expires 412, unless an abort condition or event occurs. Such abort condition or events are discussed in FIG. 5.

In the example shown in FIG. 4, the access terminal 108 may move 408 to a second region or cell covered by the second access point AP-2 124. Consequently, the access terminal 108 may receive parameters 410 for the second access point AP-1 124. These parameters 410 may include (a) an indicator of whether pre-registration is allowed by the second access point AP-2 124 or the first access network, (b) a pre-registration zone, and/or (c) a secondary pre-registration zone list. However, rather than immediately initiating pre-registration, the access terminal 108 delays until the pre-registration hysteresis timer expires 412. When the hysteresis timer expires 412, the access terminal 108 initiates pre-registration 414 through the second access point AP-2 124.

Figure 5:
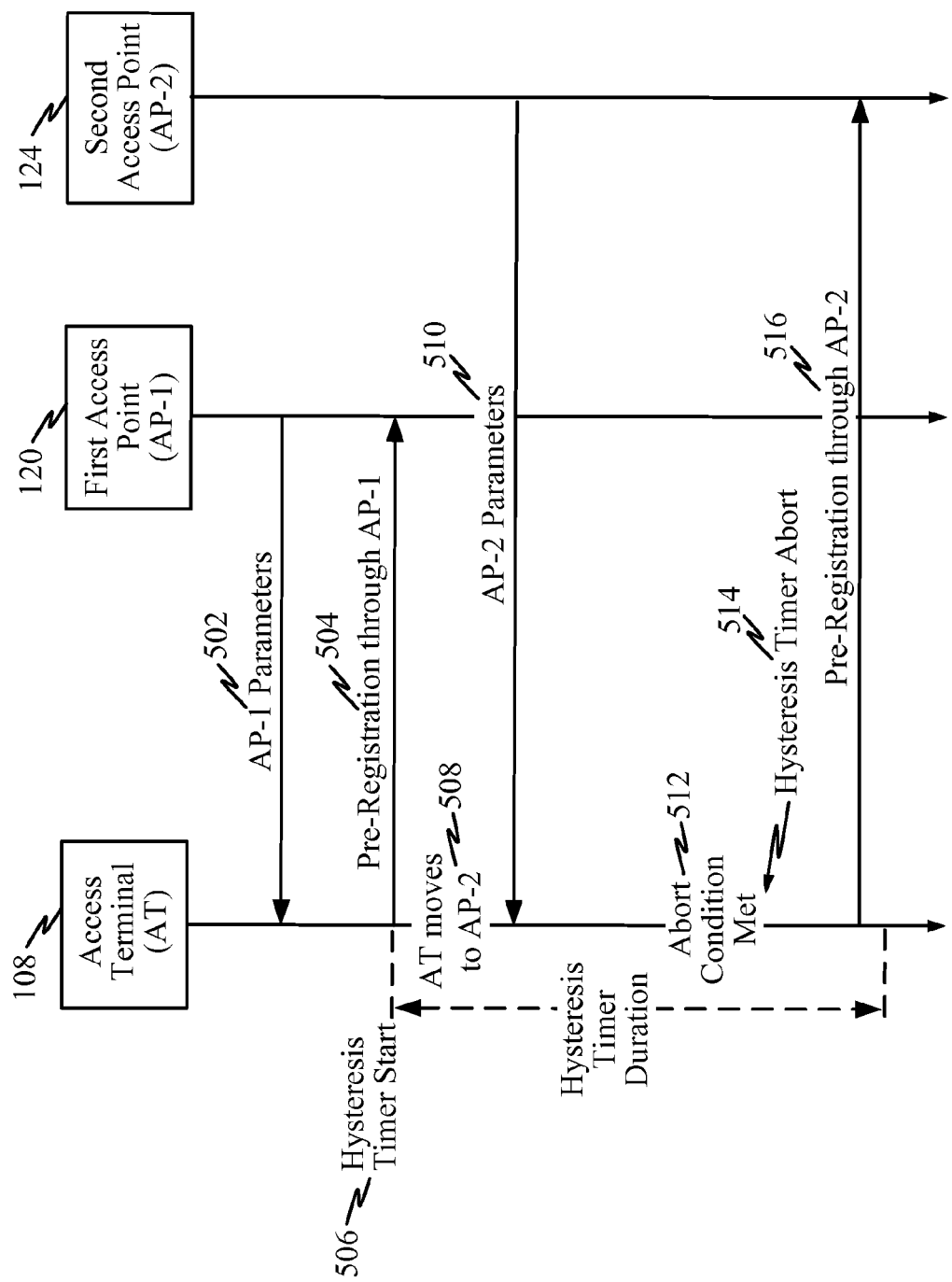
FIG. 5 illustrates a second example of how an access terminal may use a timer to restrict how often or frequently it may initiate a pre-registration process.

FIG. 5 illustrates a second example of how an access terminal may use a timer to restrict how often or frequently it may initiate a pre-registration process. For purposes of illustration, this example uses the access terminal 108 and access points 120 and 124 of the first access network 104 of FIG. 1. While operating within a first region or cell covered by the first access point AP-1 120 of a first access network 104 (FIG. 1), the access terminal 108 may receive parameters 502 for the first access point AP-1 120. Upon determining that pre-registration is allowed, the access terminal 108 may initiate pre-registration 504 through the first access point AP-1 120. Concurrent with the pre-registration 504, the access terminal 108 also starts a hysteresis timer 506. The access terminal 108 may move 508 to a second region or cell covered by the second access point AP-2 124. Consequently, the access terminal 108 may receive parameters 510 for the second access point AP-1 124. In this example, pre-registration is carried out sooner than the expiration of the hysteresis timer since a triggering event or abort condition has been met 512 prior to the expiration of the hysteresis timer. For example, the access terminal 108 may detect that a signal quality for the serving first access point 1 AP-1 120 has dropped below a signal quality threshold value, thereby aborting the hysteresis timer 514 and initiating pre-registration 512 through the second access point AP-2 124.

In one example, the abort condition to terminate the timer may be due to the access terminal 108 moving from the first access point 120 to the second access point 124 within the first access network. Such decision may be based, for instance, on an inter radio access technology (RAT) measurement criterion being met. The inter-RAT measurement criterion may be defined as a signal quality for the serving first access point 1 AP-1 120 dropping below a signal quality threshold value. This drop in signal quality may occur, for instance, when the access terminal moves from the first access point 120 to the second access point 124.

In another example, the decision to abort the timer may be based on indications or hints of an impending switch or handoff from the first access network to the second access network. For instance, the access terminal 108 may have moved service from the first access point 120 to the second access point 124 but not yet determined if pre-registration via the second access point 124 should be performed. That is, there are instances when the access terminal 108 has moved to the second access point 124 but has not yet performed a valid pre-registration (via the second access point 124). Yet, before the timer has expired so that a valid registration can occur, the access terminal may be moving into the second access network. In such situation, the access terminal 108 is at risk of switching service to the second access network 124 without pre-registration, thereby delaying the handoff process. Consequently, where the access terminal 108 determines (or is told) that a handoff from the first to second access networks is imminent, likely, or possible, the timer is terminated (or aborted) and pre-registration is initiated. For instance, this would allow the access terminal 108 to pre-register via the second access point 124 prior to a handoff to the second access network occurring. In one example, the access point 108 may receive an indicator (e.g., a "prepare for handoff" message) from either the first or second access network that such handoff is about to occur. For example, the first access network may wish to reduce its load by moving certain access terminals to the second access network. Therefore, the first access network may send a message to the access terminals that are to be handed-off. In another example, an imminent handoff may be ascertained from some user behavior, such as starting an application that is only available of the second access network.

Exemplary Access Terminal

Figure 6:
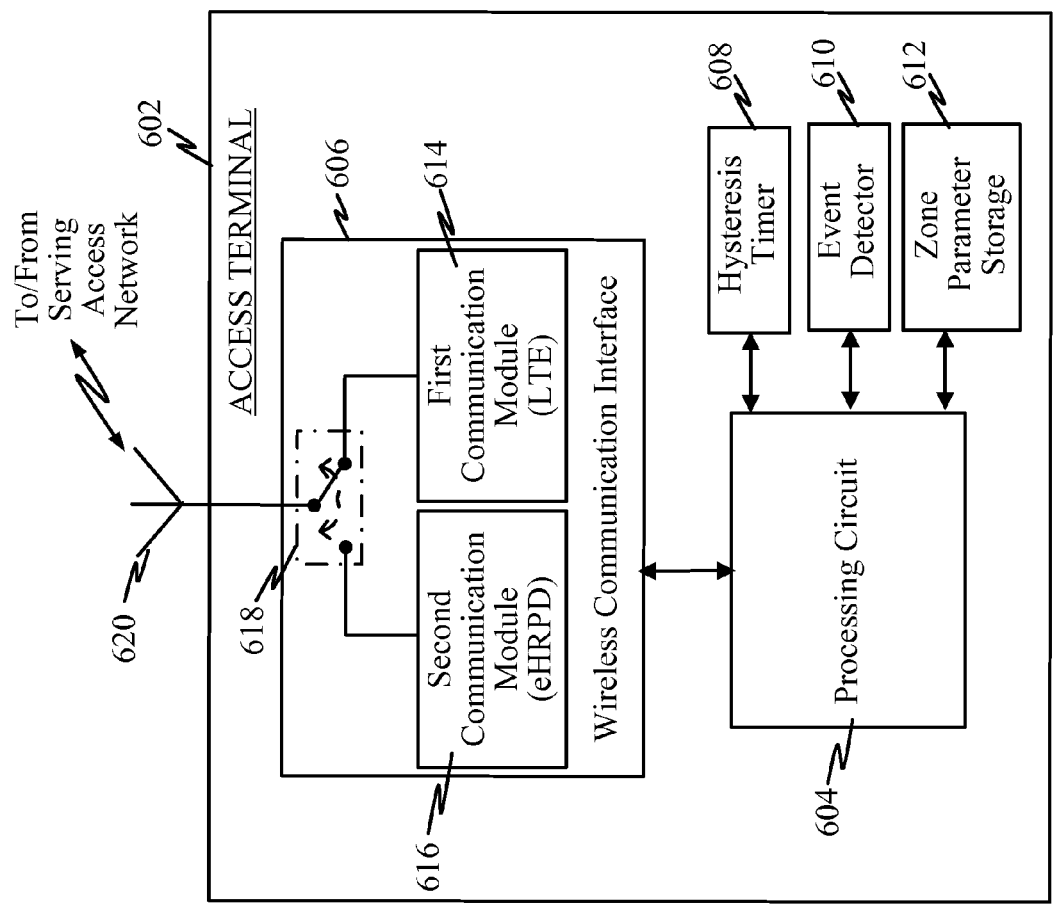
FIG. 6 is a block diagram illustrating an example of an access terminal that may be configured to implement a pre-registration hysteresis timer.

FIG. 6 is a block diagram illustrating an example of an access terminal that may be configured to implement a pre-registration hysteresis timer. The access terminal 602 may include a processing circuit 604 coupled to a wireless communication interface 606. The wireless communication interface 606 may include a first communication module 614 and a second communication module 616, where the first and second communication modules 614 and 616 may be adapted to implement wireless communications with different types of networks (e.g., eHRPD or LTE) and/or standards. For instance, in various implementations the communication modules 614 and 616 may operate on the same or different frequency bands/channels and/or may implement distinct steps in establishing communication service and/or performing wireless transmissions/reception. A switch 618 may be utilized to couple either the first or second communication module 614 or 616 to an antenna 620 depending on the serving access network in a particular area, region, or zone. According to one feature, the processing circuit 604 may be coupled to or is adapted to implement a hysteresis timer 608 that restricts how often or when a pre-registration request can be initiated by the access terminal. Such pre-registration request may be implemented via the currently serving access network register for service with a non-serving network, where the currently serving network and non-serving network implement different wireless communication standards. However, the access terminal 602 may also include an event detector 610 that tracks one or more triggering events which can be used to terminate or abort the hysteresis timer 608 before its expected end. In one example, the event detector 610 may detect (a) whether a signal quality for a serving access point has dropped below a signal quality threshold value or (b) determine whether a handoff from the first access network to the second access network is imminent or likely and that the access terminal lacks a valid pre-registration with the second access network.

If so, the processing circuit 604 may terminate the hysteresis timer and initiates a pre-registration request with the nearest access point to have advertised its parameters (e.g., the access points broadcast their parameters). The processing circuit 604 may also be coupled to a zone parameter storage 612 where it may store the parameters (e.g., pre-registration zone, secondary pre-registration zone list, etc.) for a currently serving access point and/or the most recently received access point parameters. The access terminal 602 can use the information stored in the zone parameter storage 612 to determine whether it needs to initiate pre-registration when it changes to a new serving access point. If the access terminal 602 is currently registered with either a newly advertised pre-registration zone or a zone listed in a newly advertised pre-registration zone list, then it need not initiate pre-registration with a newly serving access point.

Figure 7:
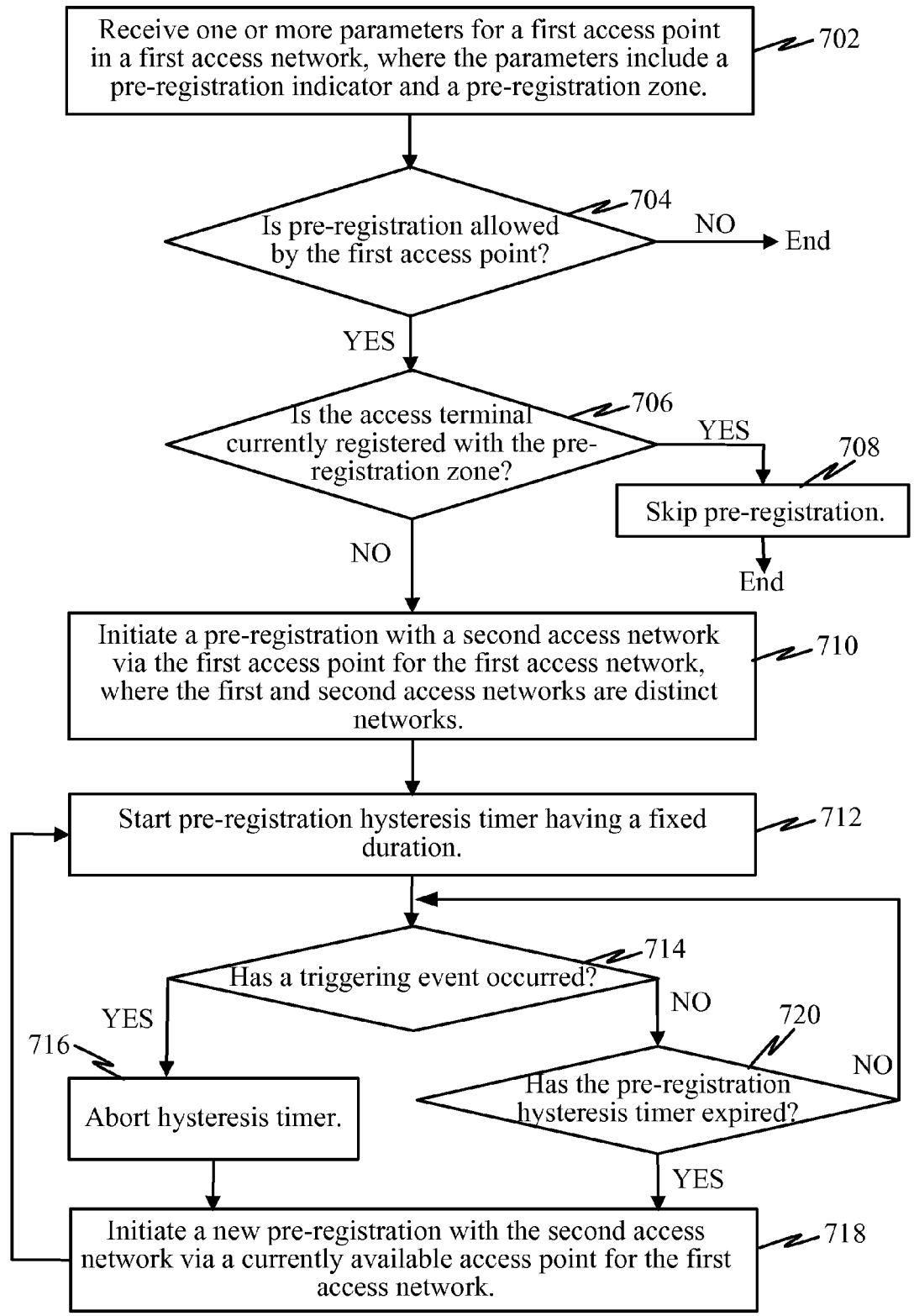
FIG. 7 illustrates a method operational in an access terminal to implement a pre-registration hysteresis timer.

FIG. 7 illustrates a method operational in an access terminal to implement a pre-registration hysteresis timer. The access terminal may receive one or more parameters for a first access point in a first access network, where the parameters include a pre-registration indicator and a pre-registration zone 702. The pre-registration indicator may indicate whether the first access point and/or the first access network allow pre-registration with a second access network via the first access network. The pre-registration zone may be indicative of one or more regions or cells in either the first or second access networks that are group together for purposes of registration in the second access network. The parameters may also include a secondary pre-registration zone list. In one example, the secondary pre-registration zone list may be a list of zones that are associated with the pre-registration zone. For example, Zone A may be the pre-registration zone and the secondary pre-registration zone list may include Zones C and D. In some instances, the access points in Zone A may have access to the registration information for access terminals registered through Zones C and D.

From the received pre-registration indicator, the access terminal determines whether pre-registration is allowed by the first access point and/or the first access network 704. If pre-registration is not allowed, then the process ends. Otherwise, the access terminal determines whether it is currently registered with the pre-registration zone 706. For example, if the pre-registration zone advertised by the first access point is Zone A and the access terminal last registered with Zone A, then pre-registration can be skipped 708 and the process ends. Otherwise, the access terminal may initiate pre-registration (e.g., by sending a pre-registration request) with a second access network via the first access point for the first access network, where the first and second access networks are distinct networks 710. Concurrent with initiating pre-registration, the access terminal may also start a pre-registration hysteresis timer having a fixed duration 712. While the hysteresis timer is running (e.g., before it expires), the access terminal may monitor to determine if a triggering event has occurred 714. Such triggering event may be used to terminate or abort the hysteresis pre-registration timer before the timer duration has expired. In one example, the triggering event may occur when a signal quality for the serving first access point has dropped below a signal quality threshold value. If a triggering event is detected, the hysteresis timer is aborted/terminated 716 and, where the access terminal has moved to a new region, it may initiate a new pre-registration (e.g., sends a new pre-registration request) with the second access network via a currently available access point for the first access network 718. The pre-registration hysteresis timer is again started 712 and the process is repeated.

Otherwise, if no triggering event is detected 714, the access terminal may determine whether the pre-registration hysteresis timer has expired 720. If the hysteresis timer has expired, then the access terminal may initiate a new pre-registration (e.g., sends a new pre-registration request) with the second access network via a currently available access point for the first access network 718.

Figure 8:
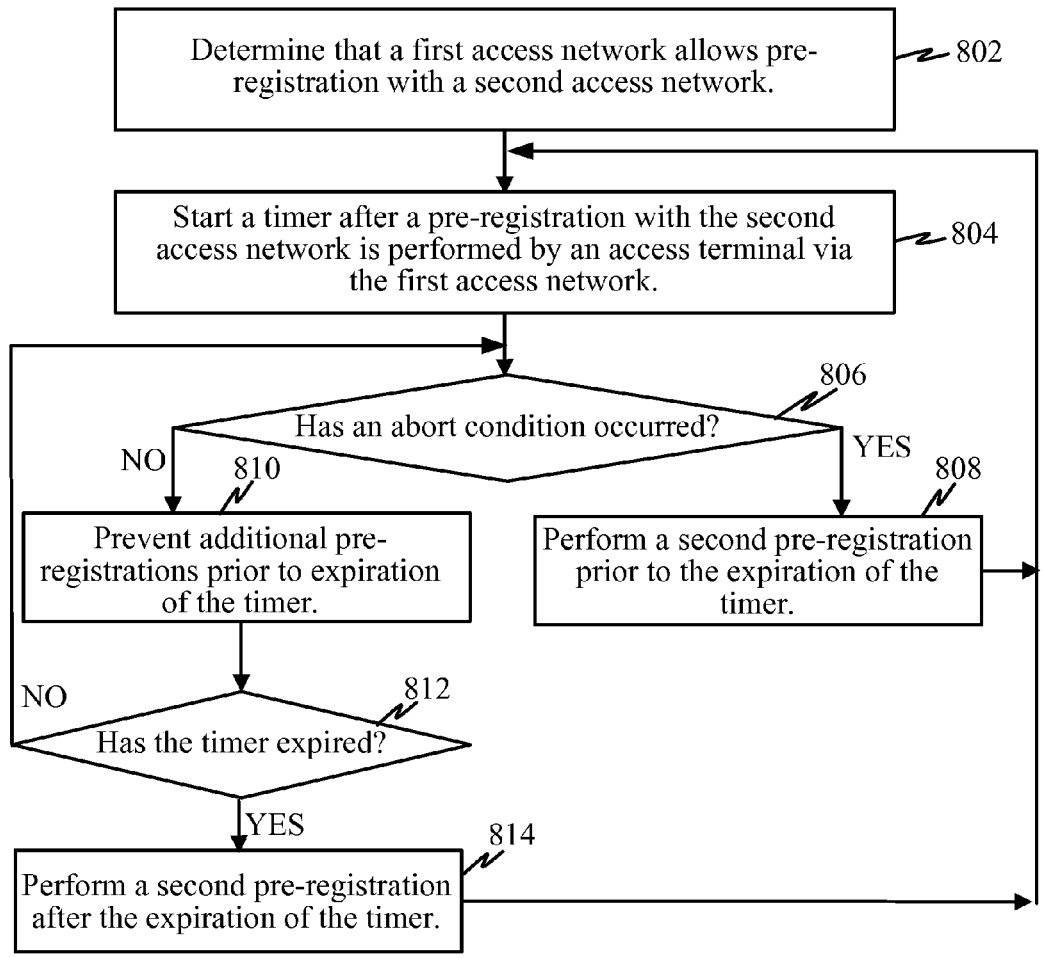
FIG. 8 illustrates another method operational in an access terminal to implement a pre-registration timer.

FIG. 8 illustrates another method operational in an access terminal to implement a pre-registration timer. The access terminal may determine that a first access network allows pre-registration with a second access network 802. Consequently, the access terminal may start a timer after pre-registration with the second access network is performed by via the first access network 804. Note that the access terminal may be operating within the first access network when pre-registration is performed and the first and second access networks are distinct from each other. The access terminal continually determines whether an abort condition has occurred or been met 806. If such abort condition is met, the access terminal may perform a second pre-registration prior to the expiration of the timer 808. Otherwise, if the abort condition has not been met 806 then the access terminal prevents additional pre-registrations prior to expiration of the timer 810. Once the timer has expired 812, the access terminal may perform a second pre-registration 814. The timer is again restarted after the second pre-registration.

Figure 9:
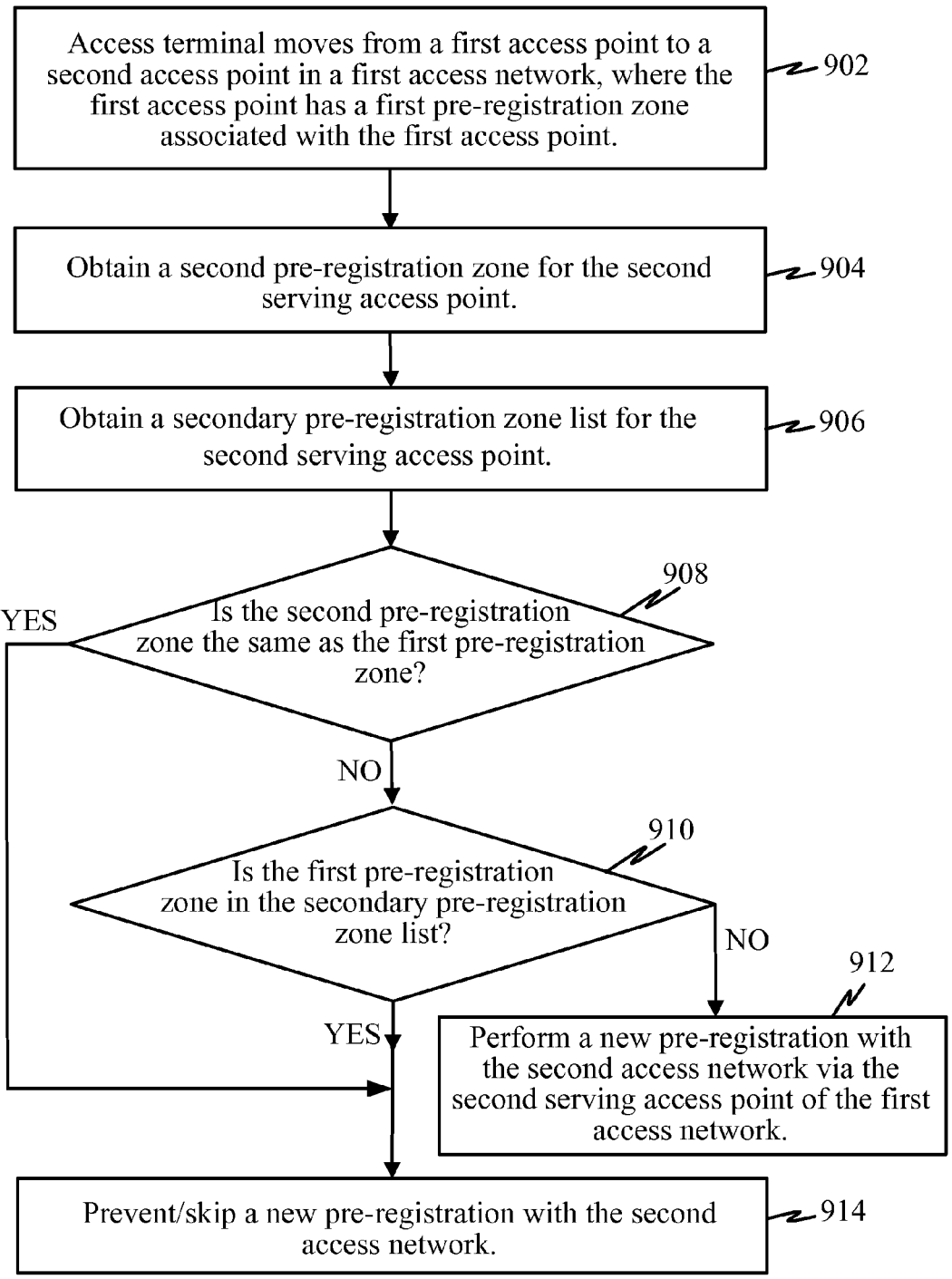
FIG. 9 illustrates a method operational in an access terminal to implement a pre-registration according to a zone deployment within a first access network.

FIG. 9 illustrates a method operational in an access terminal to implement a pre-registration according to a zone deployment within a first access network. During operation, the access terminal may move from a first access point to a second access point in a first access network, where the first access point has a first pre-registration zone is associated with the first access point 902. The access terminal may then obtain a second pre-registration zone for the second serving access point 904 and a secondary pre-registration zone list for the second serving access point 906.

To determine whether pre-registration should be performed via the second serving access point, the access terminal compares the second pre-registration zone to the first pre-registration zone 908. The access terminal prevents or skips a new pre-registration if the first pre-registration zone and the second pre-registration zone are the same. Otherwise, if the first and second pre-registration zones are distinct, the access terminal compares the first pre-registration zone to one or more zones in the secondary pre-registration zone list 910. A new pre-registration is prevented or skipped if the first pre-registration zone is found in the secondary pre-registration zone list 914. Otherwise, a new pre-registration with the second access network is performed via the second serving access point of the first access network 912. Note that this method may be implemented in various types of zones as illustrated in FIGS. 10-14.

Exemplary Pre-Registration Zone Deployment

According to other features, the pre-registration zones may be arranged, organized, and/or deployed in various ways so as to avoid the need to perform multiple pre-registrations in quick succession.

In a first deployment method, the access points and/or cells along the boundary of two or more pre-registration zones are grouped into a separate "boundary pre-registration zone". The access points and/or cells in the boundary zones include all the bordering pre-registration zones in their secondary pre-registration zone list. This deployment method becomes clear by way of a couple of examples.

Figure 10:
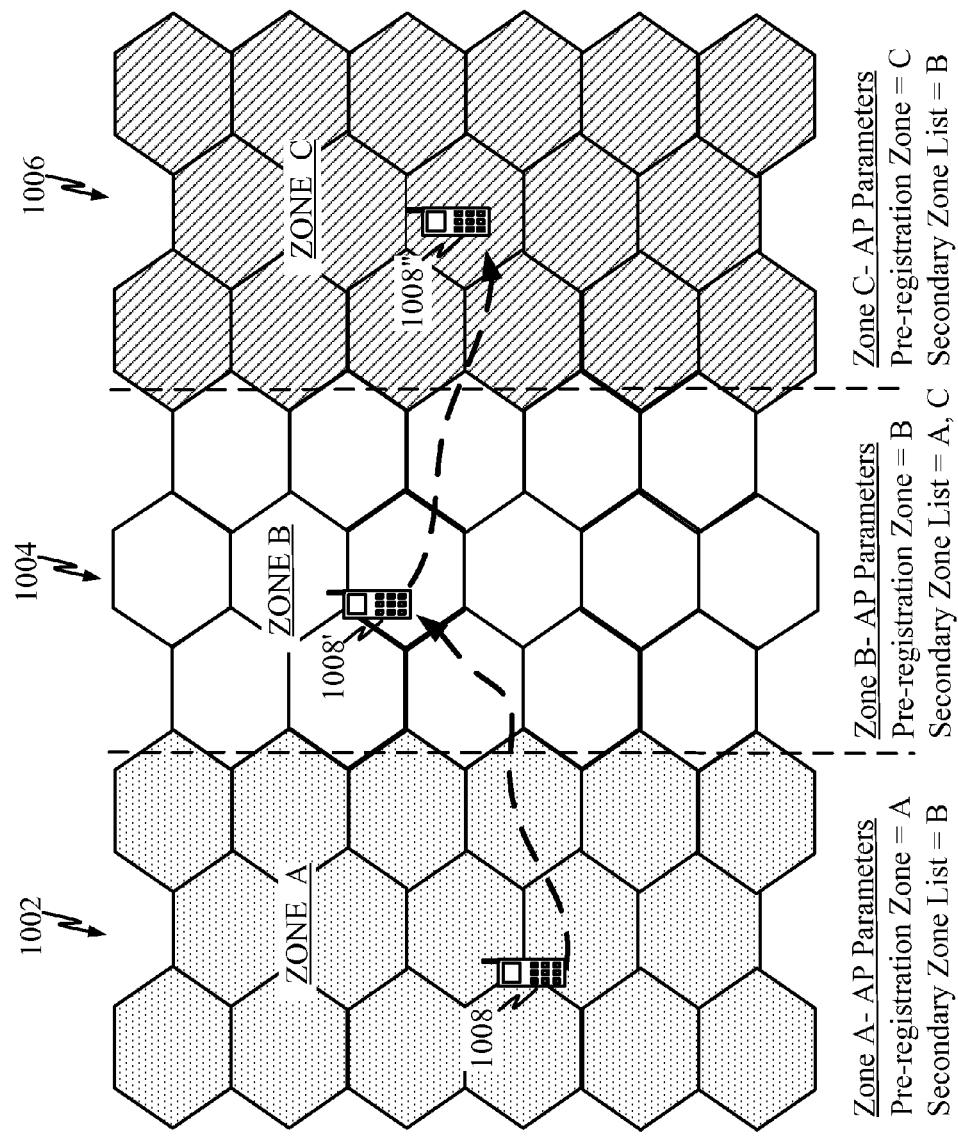
FIG. 10 illustrates an example of how pre-registration zones may be defined or arranged so as to minimize frequent pre-registration requests by an access terminal.

FIG. 10 illustrates an example of how pre-registration zones may be defined or arranged so as to minimize frequent pre-registration requests by an access terminal. Several cells for a first access network (e.g., an LTE network) are grouped together into a zone. In this example, cells are grouped into three zones 1002, 1004 and 1006. The first zone 1002 (Zone A) includes cells having access points that all advertise a Pre-Registration Zone A and a Secondary Pre-Registration Zone List that includes Zone B. The second zone 1004 (Zone B) includes cells having access points that all advertise a Pre-Registration Zone B and a Secondary Pre-Registration Zone List that includes Zones A and C. Note that Zone B 1004 is considered a boundary zone since it is between the first zone 1002 (Zone A) and the third zone 1006 (Zone C). The third zone 1006 (Zone C) includes cells having access points that all advertise a Pre-Registration Zone C and a Secondary Pre-Registration Zone List that includes Zone B.

An access terminal 1008 may power up in a first cell in the first zone 1002 (Zone A) and realizes that pre-registration is allowed. Therefore, the access terminal 1008 initiates a first pre-registration request with a second access network (e.g., eHRPD network) and remembers or stores the pre-registration zone (Zone A). The access terminal 1008 moves to a second cell in the second zone 1004 (e.g., the boundary zone). The access terminal 1008' learns that pre-registration is allowed by its serving access point in the second cell. Since it has pre-registered before, the access terminal 1008' recalls its last pre-registration zone (Zone A). The access terminal 1008' then compares the last pre-registration zone (Zone A) with the currently advertised pre-registration zone (Zone B) and the secondary pre-registration zone list (Zones A and C) in the second zone 1004 (Zone B). Since the pre-registration zone (Zone A) where the access terminal 1008' had performed its last pre-registration matches one of the zones listed in the secondary pre-registration zone list, the access terminal 1008' does not repeat pre-registration again. The access terminal 1008' may subsequently move to a third cell in the third zone 1006 (Zone C). While in the third cell, the access terminal 1008" realizes that its last pre-registered zone (Zone A) no longer matches the pre-registration zone (Zone C) or the secondary pre-registration zone list (Zone B) advertised by the serving access point for the third cell. Therefore, the access terminal 1008" performs or sends a second pre-registration request.

In the example of FIG. 10, since the second zone 1004 (e.g., the boundary zone) is present between the first and the second zones (Zones A and C), and since the access points in the second zone 1004 (Zone B) include the first and the third zones (Zones A and B) in their secondary pre-registration zone lists, the access terminal 1008 can avoid performing pre-registration in quick succession. By virtue of having the boundary zone 1004 (Zone B), sufficient delay is introduced between the first pre-registration and the second pre-registration, thereby reducing the strain on power consumption and minimizing over-the-air resource consumption.

Figure 11:
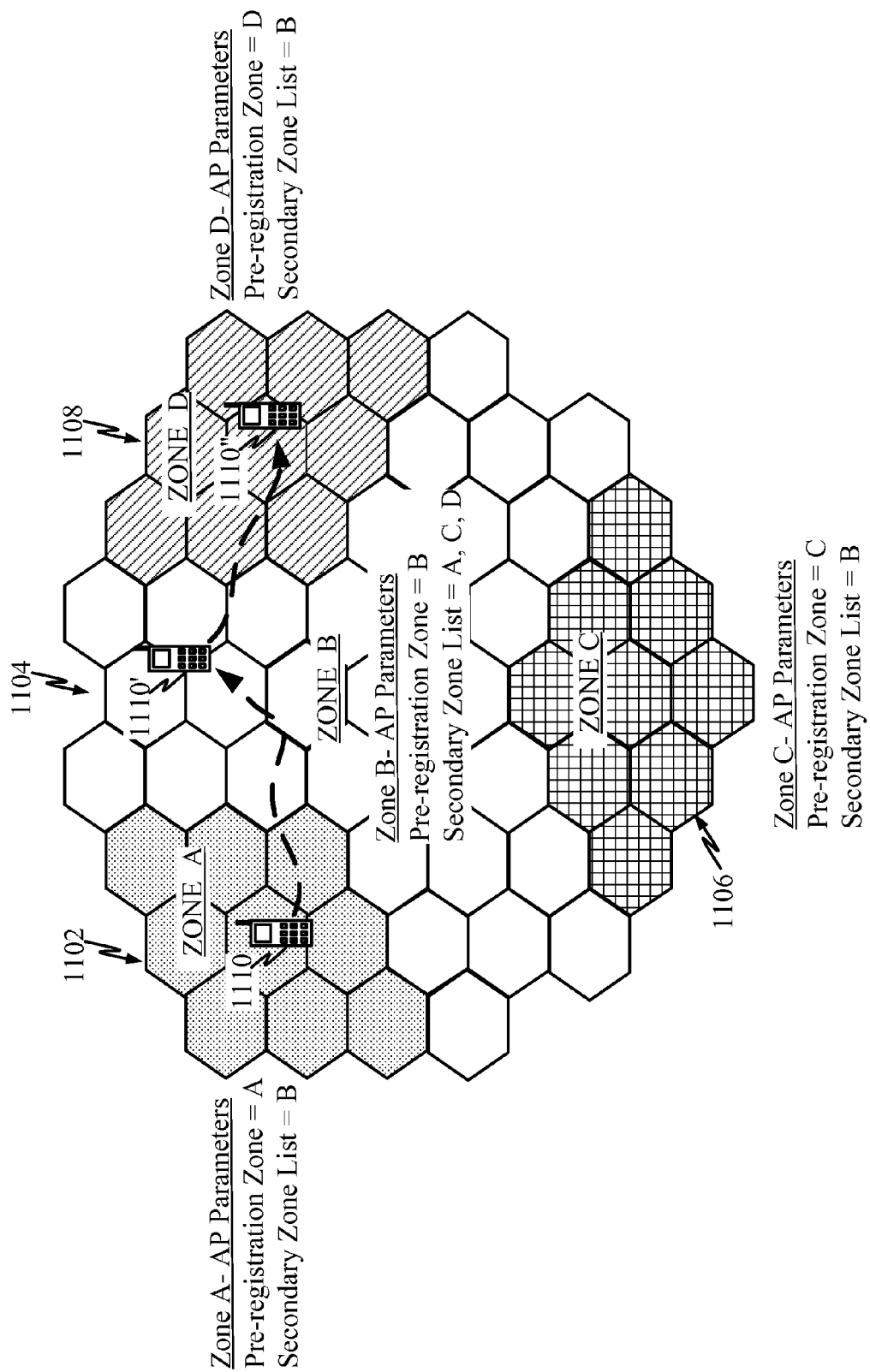
FIG. 11 illustrates another example of how pre-registration zones may be defined or arranged so as to minimize frequent pre-registration requests by an access terminal.

FIG. 11 illustrates another example of how pre-registration zones may be defined or arranged so as to minimize frequent pre-registration requests by an access terminal. Several cells for a first access network (e.g., an LTE network) are grouped together into a zone. In this example, cells are grouped into four zones 1102, 1104, 1106 and 1108. The first zone 1102 (Zone A) includes cells having access points that all advertise a Pre-Registration Zone A and a Secondary Pre-Registration Zone List that includes Zone B. The second zone 1104 (Zone B) includes cells having access points that all advertise a Pre-Registration Zone B and a Secondary Pre-Registration Zone List that includes Zones A, C and D. Note that Zone B 1104 is considered a boundary zone since it is between the first zone 1102 (Zone A), the third zone 1106 (Zone C), and the fourth zone 1108 (Zone D). The third zone 1106 (Zone C) includes cells having access points that all advertise a Pre-Registration Zone C and a Secondary Pre-Registration Zone List that includes Zone B. The fourth zone 1108 (Zone D) includes cells having access points that all advertise a Pre-Registration Zone D and a Secondary Pre-Registration Zone List that includes Zone B.

An access terminal 1110 may power up in a first cell in the first zone 1102 (Zone A) and realizes that pre-registration is allowed. Therefore, the access terminal 1110 initiates a first pre-registration request with a second access network (e.g., eHRPD network) and remembers or stores the pre-registration zone (Zone A). The access terminal 1110 moves to a second cell in the second zone 1104 (e.g., the boundary zone). The access terminal 1110' learns that pre-registration is allowed by its serving access point in the second cell. Since it has pre-registered before, the access terminal 1110' recalls its last pre-registration zone (Zone A). The access terminal 1110' then compares the last pre-registration zone (Zone A) with the currently advertised pre-registration zone (Zone B) and the secondary pre-registration zone list (Zones A and C) in the second zone 1104 (Zone B). Since the pre-registration zone (Zone A) where the access terminal 1110' had performed its last pre-registration matches one of the zones listed in the secondary pre-registration zone list for the second zone 1104 (Zone B), the access terminal 1110' does not repeat pre-registration again. The access terminal 808' may subsequently move to a third cell in the fourth zone 1108 (Zone D). While in the third cell, the access terminal 1110" realizes that its last pre-registered zone (Zone A) no longer matches the pre-registration zone (Zone D) or the secondary pre-registration zone list (Zone B) advertised by the serving access point for the third cell in the fourth zone 1108. Therefore, the access terminal 1110" performs or sends a second pre-registration request.

In the examples illustrated in FIGS. 10 and 11, the secondary pre-registration zone lists for each zone may include only adjacent zones. However, the same zone deployment principles illustrated in FIGS. 10 and 11 can be applied or expanded in several different ways to minimize or reduce pre-registration attempts by an access terminal.

Figure 12:
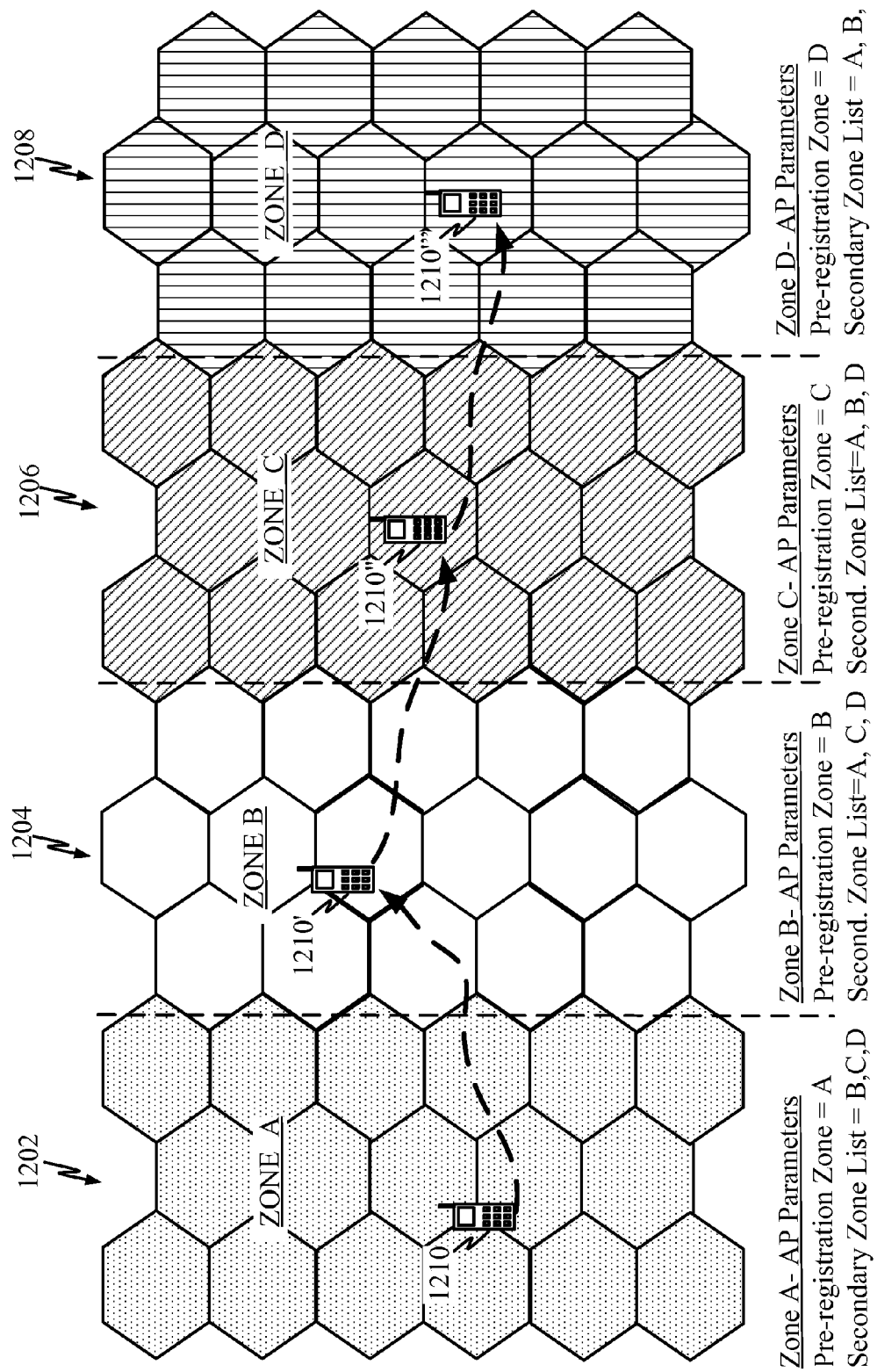
FIG. 12 illustrates yet another example of how pre-registration zones may be defined or arranged so as to minimize frequent pre-registration requests by an access terminal.

FIG. 12 illustrates yet another example of how pre-registration zones may be defined or arranged so as to minimize frequent pre-registration requests by an access terminal. In this example, a first access network may be divided into at least four zones 1202, 1204, 1206, and 1208, each zone defined by a plurality of cells. In this implementation, each secondary zone list includes all other zones defined in the first access network. For example, the first zone 1202 (Zone A) includes cells having access points that all advertise a Pre-Registration Zone A and a Secondary Pre-Registration Zone List that includes Zones B, C, and D. The second zone 1204 (Zone B) includes cells having access points that all advertise a Pre-Registration Zone B and a Secondary Pre-Registration Zone List that includes Zones A, C and D. The third zone 1206 (Zone C) includes cells having access points that all advertise a Pre-Registration Zone C and a Secondary Pre-Registration Zone List that includes Zones A, B, and D. The fourth zone 1208 (Zone D) includes cells having access points that all advertise a Pre-Registration Zone D and a Secondary Pre-Registration Zone List that includes Zones A, B, and D. Because the access points in the first, second third, and fourth zones 1202, 1204, 1206, and 1208 all advertise the other zones in their secondary pre-registration zone list, an access terminal need only pre-register once in any of these zones. For example, an access terminal 1210 may initially register in the first zone 1202 (Zone A). As the access terminal 1210 moves across the various zones other 1204, 1206, and 1208, it need not perform pre-registration again since every zone 1204, 1206, and 1208 also include Zone A in their secondary pre-registration zone lists.

Figure 13:
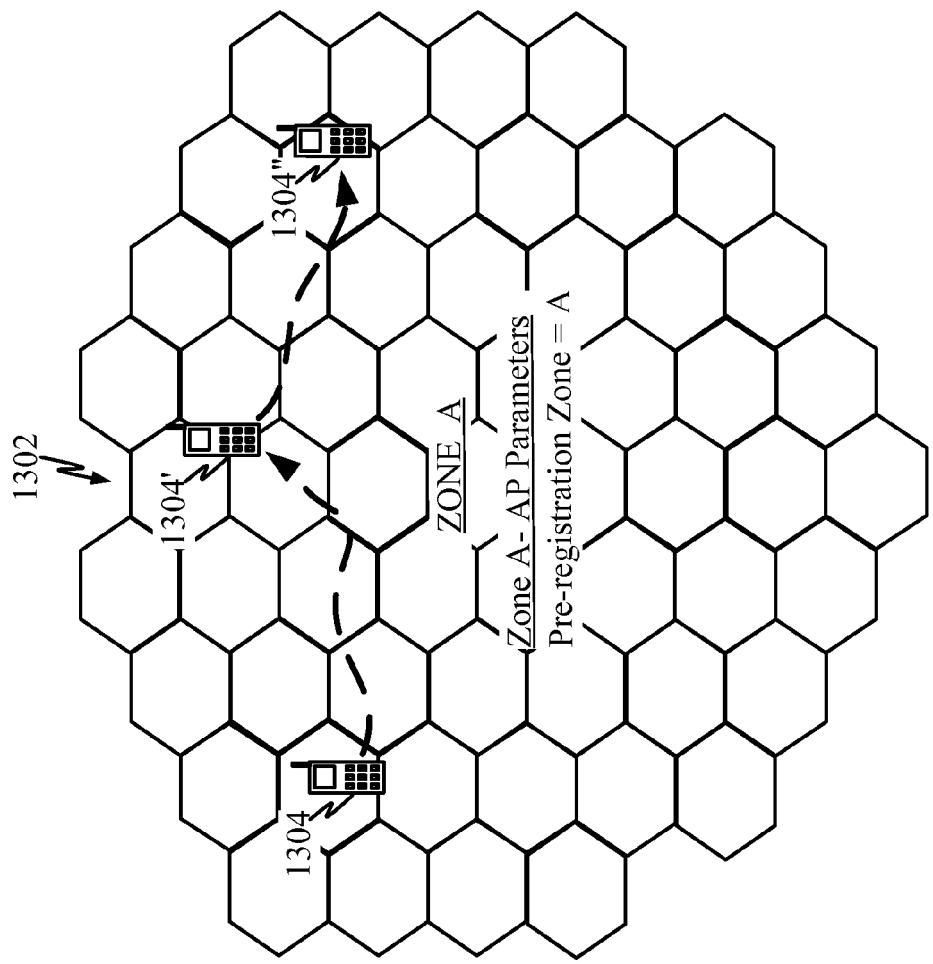
FIG. 13 illustrates yet another example of how pre-registration zones may be defined or arranged so as to minimize frequent pre-registration requests by an access terminal.

FIG. 13 illustrates yet another example of how pre-registration zones may be defined or arranged so as to minimize frequent pre-registration requests by an access terminal. In this example, all access points for all cells in a first access network are grouped into a single zone 1302. Consequently, all access points advertise the same pre-registration zone (Zone A). As a result an access terminal 1304 pre-registers just once in the entire network or zone 1302. As the access terminal 1304 moves within the first access network or zone 1302, the access terminal 1304 does not encounter any pre-registration zone change throughout the network, and therefore pre-registration is not performed again.

Exemplary Network Server that Defines Pre-Registration Zones

Figure 14:
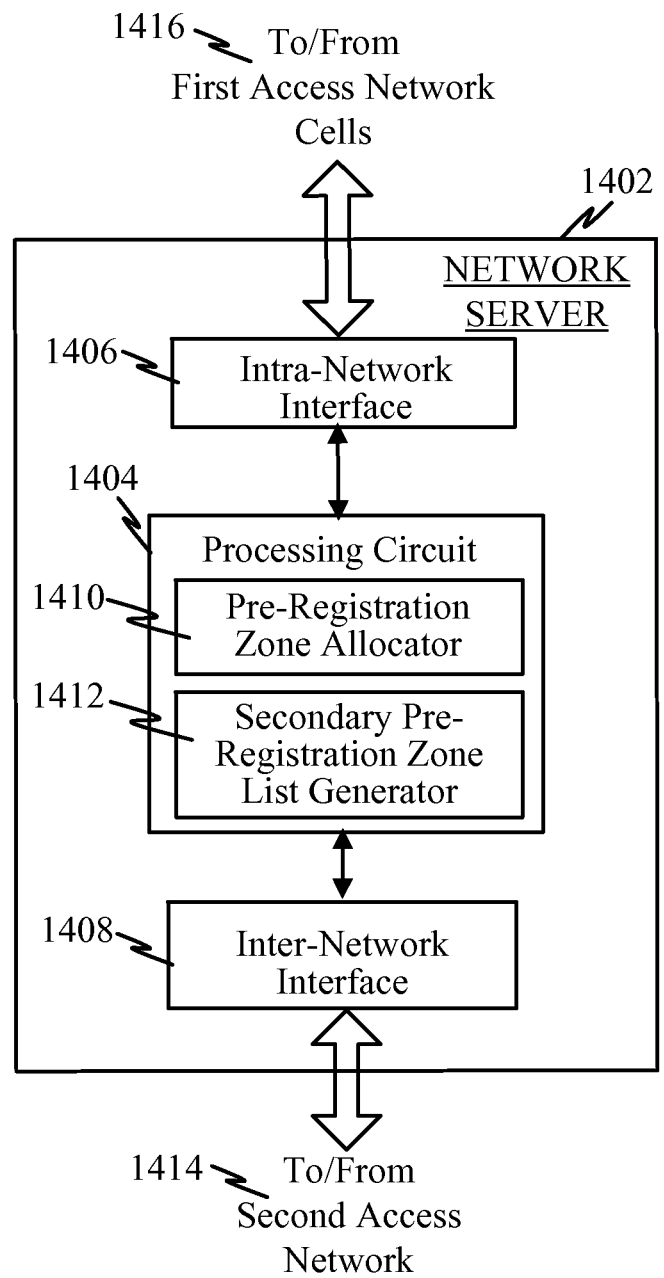
FIG. 14 is a block diagram illustrating an example of a network server that may operate within a first access network to allocate pre-registration zones and/or secondary pre-registration zone lists to cells within the first access network.

FIG. 14 is a block diagram illustrating an example of a network server that may operate within a first access network to allocate pre-registration zones and/or secondary pre-registration zone lists to cells within the first access network. The network server 1402 may include a processing circuit 1404 coupled to an intra-network interface 1406 and an inter-network interface 1408. The intra-network interface 1406 allows the network server 1402 to communicate with a plurality of cells (or access points in each cell) within the first access network. The inter-network interface 1408 allows the network server 1402 to communicate with other networks, including a second access network. The processing circuit 1404 may implement a pre-registration zone allocator 1410 that assigns one or more zones to each cell in the first access network. Additionally, the processing circuit 1404 may also implement a secondary pre-registration zone list generator 1412 that generates a list of zones associated with the allocated pre-registration zone.

The network server 1402 may implement one or more of the pre-registration zone arrangements described in FIGS. 10, 11, 12 and/or 13.

Figure 15:
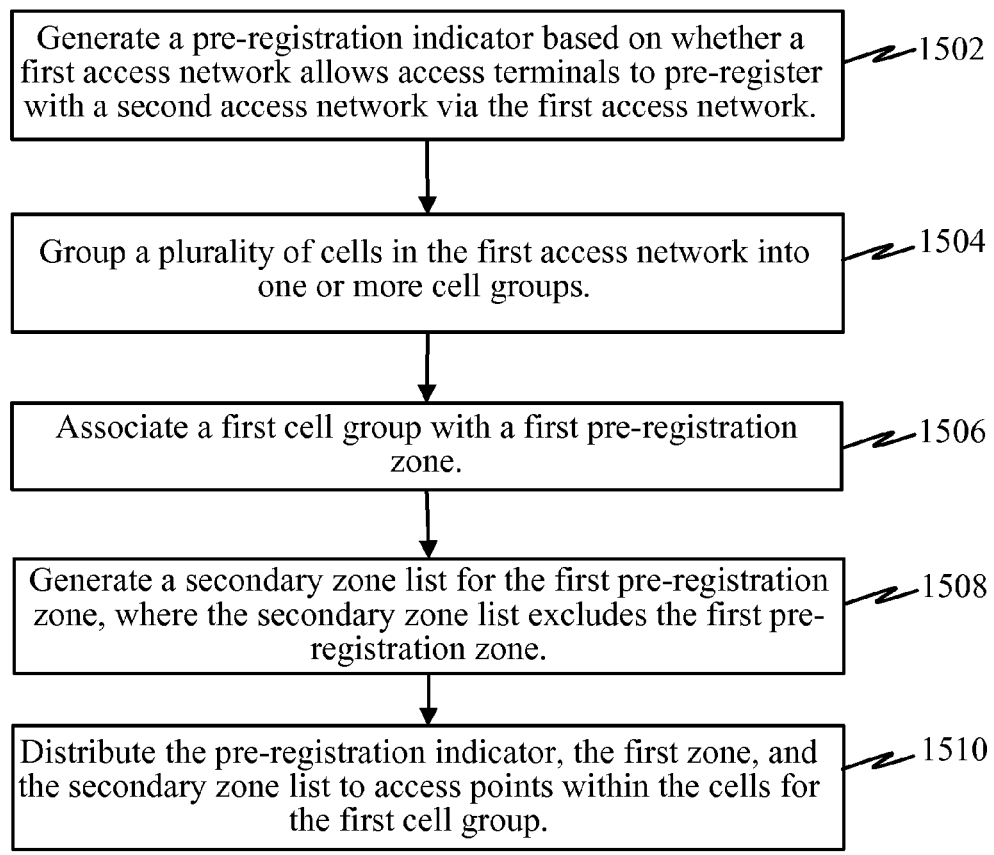
FIG. 15 illustrates one example of a method that may be operational in the network server to allocate pre-registration zones and/or secondary pre-registration zone lists to cells within a first access network.

FIG. 15 illustrates one example of a method that may be operational in the network server to allocate pre-registration zones and/or secondary pre-registration zone lists to cells within a first access network. The network server may generate a pre-registration indicator based on whether a first access network allows access terminals to pre-register with a second access network via the first access network 1502. A plurality of cells in the first access network is then grouped into one or more cell groups 1504. The network server then associates a first cell group with a first pre-registration zone 1506. A secondary zone list for the first pre-registration zone is then generated, where the secondary zone list excludes the first pre-registration zone 1508. Alt least one of the pre-registration indicator, the first pre-registration zone, and/or the secondary zone list are distributed to access points within the cells for the first cell group 1510. The access point for each cell in the first cell group may subsequently broadcast these parameters (e.g., re-registration indicator, the first zone, and the secondary zone list) to access terminals within the cell.

Figure 16:
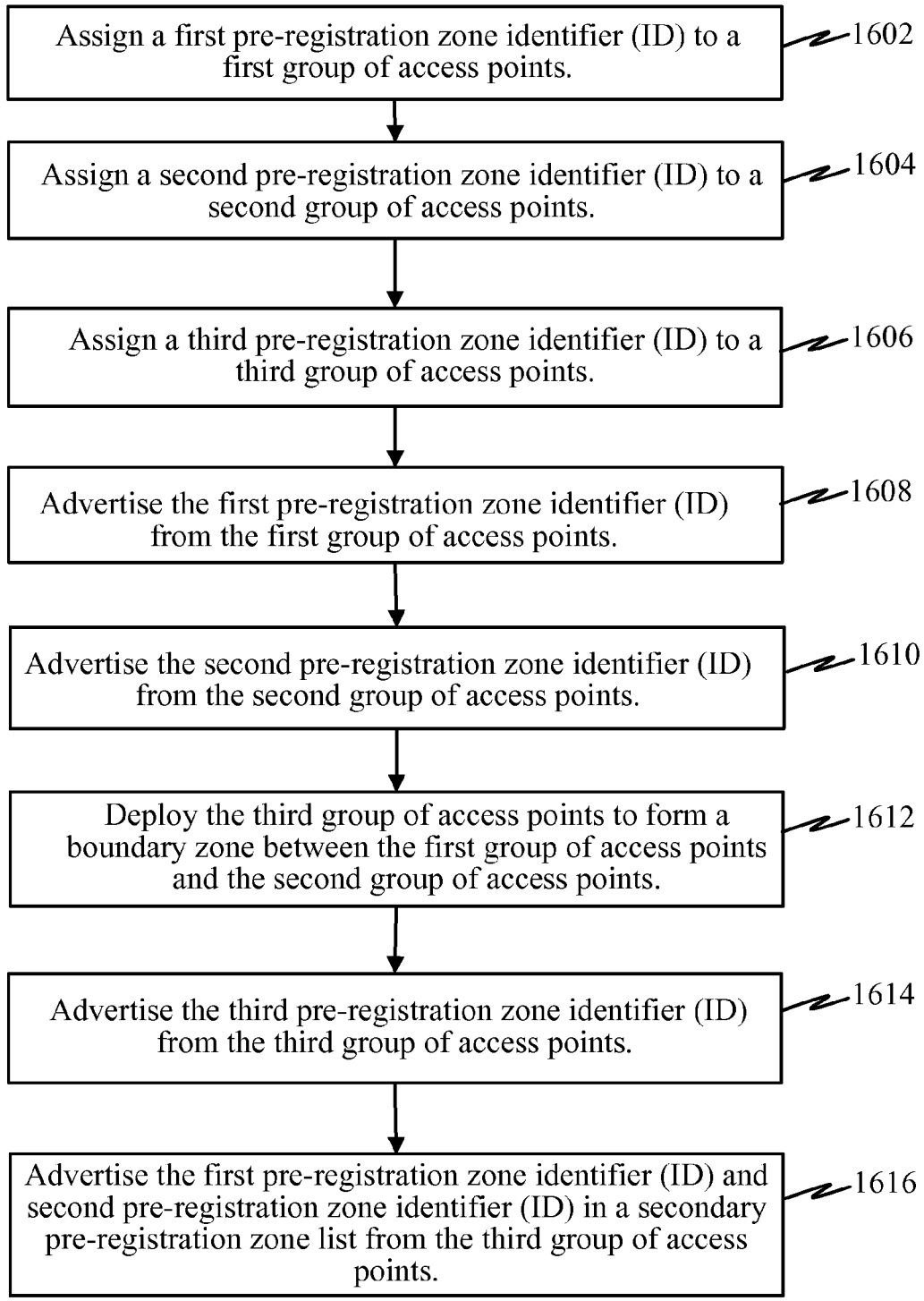
FIG. 16 illustrates one example of how a plurality of access points within a first access network may be organized to reduce the number of pre-registration attempts by access terminals operating within the first access network.

FIG. 16 illustrates one example of how a plurality of access points within a first access network may be organized to reduce the number of pre-registration attempts by access terminals operating within the first access network. Note that an access point may provide wireless network coverage (service) within one or more network cells. Each access point has been assigned or allocated to a group which is identifiable by a pre-registration zone identifier. A first group of access points is assigned a first pre-registration zone identifier (ID) 1602. A second group of access points is assigned a second pre-registration zone identifier (ID) 1604. A third group of access points is assigned a third pre-registration zone identifier (ID) 1606.

The first group of access points advertises (e.g., broadcast) a first pre-registration zone identifier (ID) 1608. The second group of access points advertises (e.g., broadcast) the second pre-registration zone identifier (ID) 1610. The third group of access points may be deployed to form a boundary zone between the first group of access points and the second group of access points 1612. The third group of access points advertises (e.g., broadcast) the third pre-registration zone identifier (ID) 1614. The third group of access points advertises the first pre-registration zone identifier (ID) and second pre-registration zone identifier (ID) in a secondary pre-registration zone list 1616.

Exemplary Access Point

Figure 17:
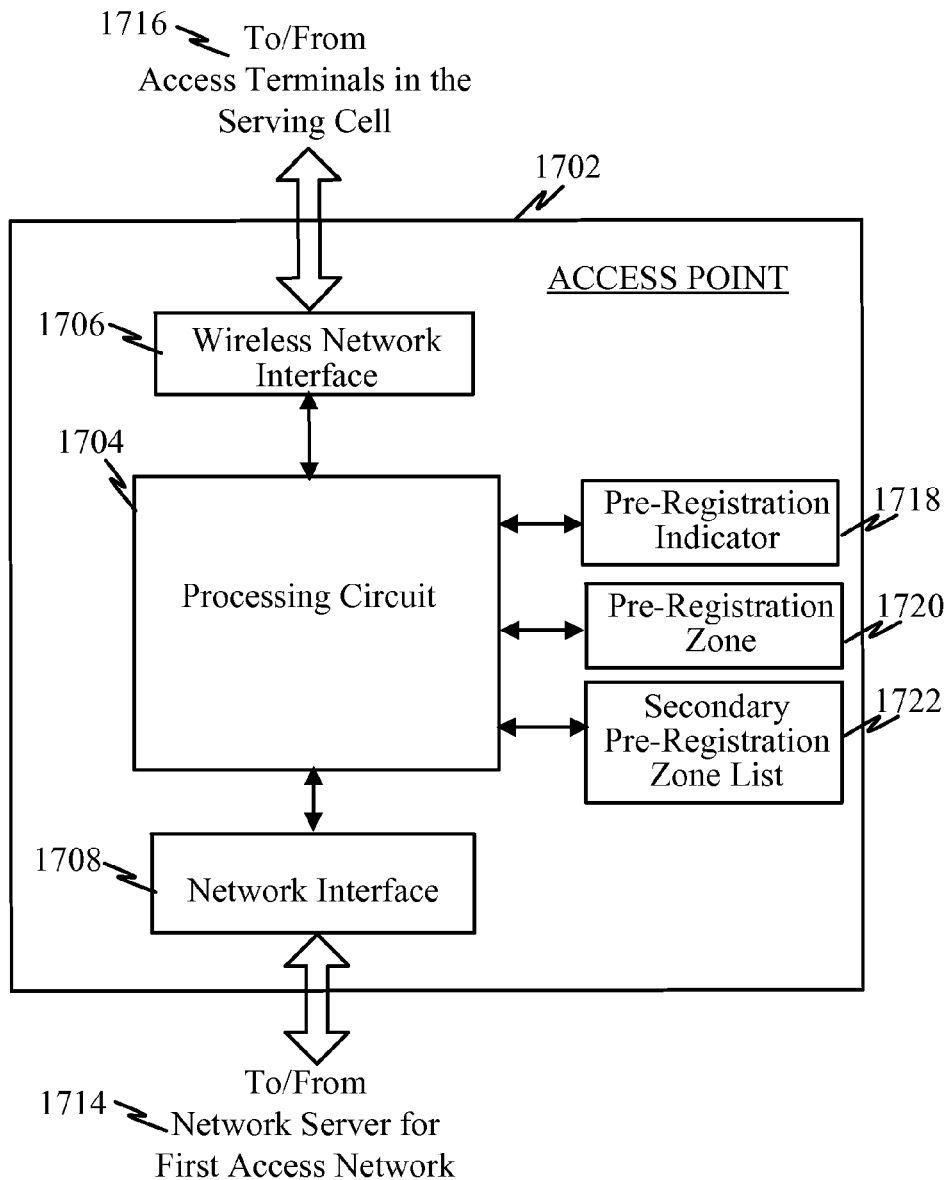
FIG. 17 is a block diagram illustrating an example of an access point that may operate within a first access network to distribute pre-registration zones and/or secondary pre-registration zone lists within the first access network.

FIG. 17 is a block diagram illustrating an example of an access point that may operate within a first access network to distribute pre-registration zones and/or secondary pre-registration zone lists within the first access network. The access point 1702 may serve access terminal operating within a first cell of the first access network. The access point may include a processing circuit 1704 coupled to a wireless communication interface 1706 and a network interface 1708. The wireless network interface 1706 allows the access point 1702 to communicate with one or more access terminals within the first cell 1716 served by the access point. The network interface 1708 allows the access point 1702 to communicate with a network server or other network infrastructure entities that facilitate communications to a second access network. The access point may receive (via the network interface 1708), obtain, or otherwise generates a pre-registration indicator 1718, a pre-registration zone 1720, and a secondary pre-registration zone list 1722. The pre-registration indicator 1718 is used to inform the access point 1702 and/or access terminals it serves within the first cell of whether the first access network allows pre-registration with a second access network via the first access network. The pre-registration zone is an indicator of the group of cells within the first access network to which the access point has been assigned. The secondary pre-registration zone list 1722 is a list of zones associated with the pre-registration zone 1722. The access point 1702 then broadcasts one or more of the pre-registration indicator, the pre-registration zone, and/or the secondary pre-registration zone list 1722. The access point 1702 may also receive a pre-registration request with a second access network from one or more access terminals operating within the first access network. If the pre-registration indicator indicates that such pre-registration is allowed, the access point 1702 routes the pre-registration request to the second access network.

Figure 18:
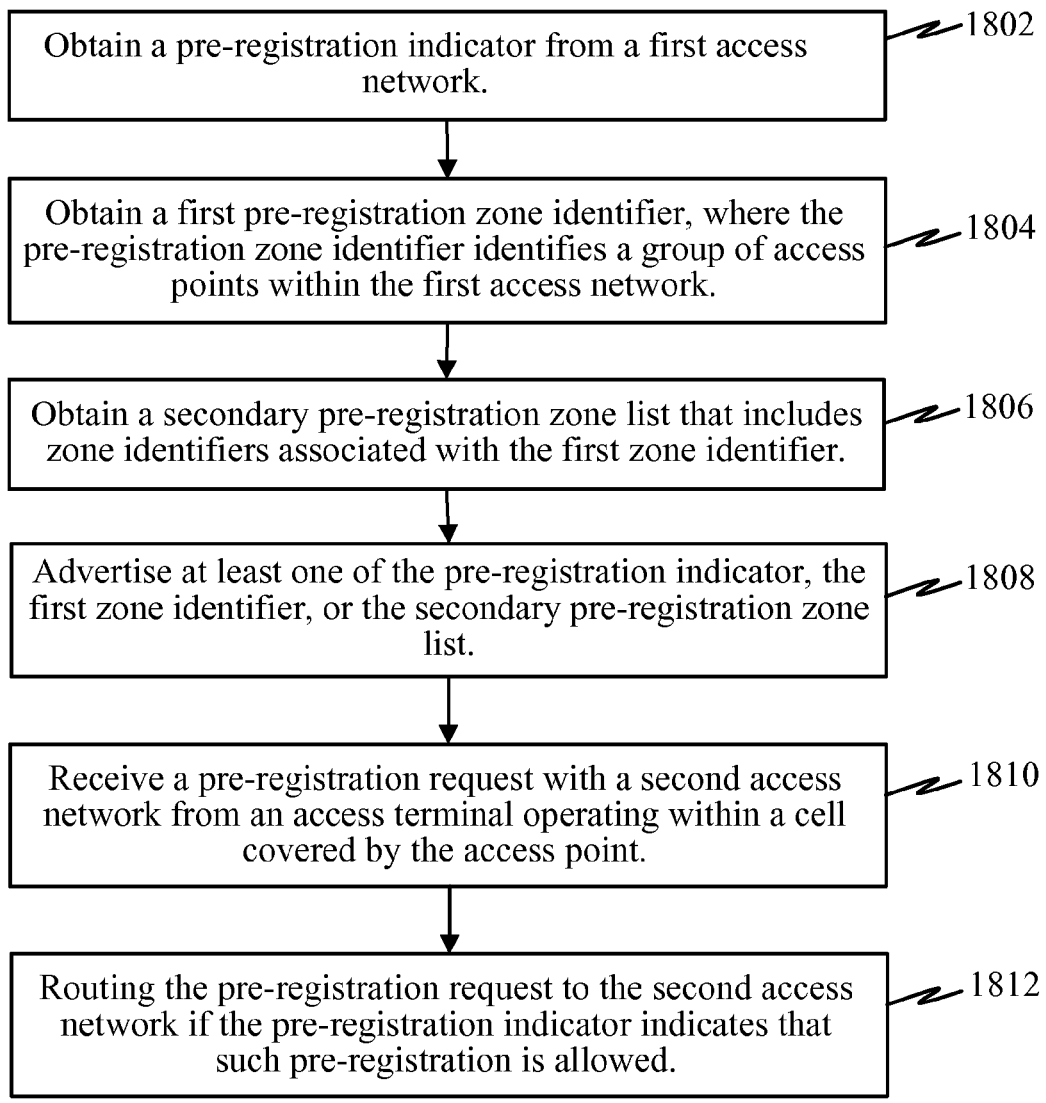
FIG. 18 illustrates a method operational in an access point to distribute pre-registration information to access terminals.

FIG. 18 illustrates a method operational in an access point to distribute pre-registration information to access terminals. The access point may obtain a pre-registration indicator from a first access network 1802. Additionally, the access point may also obtain a first pre-registration zone identifier, where the pre-registration zone identifier identifies a group of access points within the first access network 1804. The access point may also obtain a secondary pre-registration zone list that includes zone identifiers associated with the first zone identifier 1806. The access point advertises (e.g., broadcasts) at least one of the pre-registration indicator, the first zone identifier, or the secondary pre-registration zone list 1808. A pre-registration request with a second access network may be received from an access terminal operating within a cell covered by the access point 1810. The pre-registration request is routed to the second access network if the pre-registration indicator indicates that such pre-registration is allowed.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

One or more of the components, steps, and/or functions illustrated in FIGS. 1, 2, 3, 4, 5, 6, 7, 8, 9, 10, 11, 12, 13, 14, 15, 16, 17 and/or 18 may be rearranged and/or combined into a single component, step, or function or embodied in several components, steps, or functions. Additional elements, components, steps, and/or functions may also be added without departing from the invention.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method operational in an access point of a first access network, comprising:
    obtaining a pre-registration indicator from the first access network, wherein the pre-registration indicator indicates whether the first access network allows pre-registration with a second access network via the first access network;
    obtaining a first pre-registration zone identifier, where the first pre-registration zone identifier identifies a group of access points within the first access network;
    obtaining a secondary pre-registration zone list that includes zone identifiers associated with the first pre-registration zone identifier; and
    advertising the pre-registration indicator, the first pre-registration zone identifier, and the secondary pre-registration zone list to one or more access terminals in a cell covered by the access point.

2. The method of claim 1, further comprising:
    receiving a pre-registration request for the second access network from an access terminal operating within a cell covered by the access point; and
    routing the pre-registration request to the second access network if the pre-registration indicator indicates that such pre-registration is allowed.

3. The method of claim 1, wherein the first pre-registration zone identifier and the secondary pre-registration zone list is utilized by receiving access terminals in a cell covered by the access point to determine whether a new pre-registration is needed with a second access network via the access point of the first access network.

4. An access point, comprising:
    a wireless network interface to communicate with access terminals in a cell within a first access network;
    a network interface to communicate with a second access network; and
    a processing circuit coupled to the wireless network interface and the network interface, the processing circuit adapted to:
    obtain a pre-registration indicator from the first access network, wherein the pre-registration indicator indicates whether the first access network allows pre-registration with a second access network via the first access network;
    obtain a first pre-registration zone identifier, where the pre-registration zone identifier identifies a group of access points within the first access network;
    obtain a secondary pre-registration zone list that includes zone identifiers associated with the first pre-registration zone identifier; and
    advertise the pre-registration indicator, the first pre-registration zone identifier, and the secondary pre-registration zone list to one or more access terminals in a cell covered by the access point.

5. The access point of claim 4, wherein the processing circuit is further adapted to:
    receive a pre-registration request for the second access network from an access terminal operating within a cell covered by the access point; and
    route the pre-registration request to the second access network if the pre-registration indicator indicates that such pre-registration is allowed.

6. A method operational in a network server of a first access network, comprising:
    generating a pre-registration indicator based on whether the first access network allows access terminals to pre-register with a second access network via the first access network;
    grouping a plurality of cells in a first access network into one or more cell groups;
    associating a first cell group with a first pre-registration zone;
    generating a secondary zone list for the first pre-registration zone, where the secondary zone list excludes the first pre-registration zone; and
    distributing the pre-registration indicator, the first pre-registration zone and the secondary zone list to access points within the cells for the first cell group.

7. The method of claim 6, wherein the first pre-registration zone and the secondary zone list is utilized by receiving access terminals to determine whether a new pre-registration is needed with a second access network via the first access network.

8. A method for deploying access points and pre-registration zones within a first access network, comprising:
    advertising a first pre-registration zone identifier from a first group of access points;
    advertising a second pre-registration zone identifier from a second group of access points;
    deploying a third group of access points to form a boundary zone between the first group of access points and the second group of access points;
    advertising a third pre-registration zone identifier from the third group of access points; and
    advertising the first pre-registration zone identifier and second pre-registration zone identifier in a secondary pre-registration zone list from the third group of access points.

9. The method of claim 8, wherein the secondary pre-registration zone list excludes the third pre-registration zone identifier.

10. The method of claim 8, further comprising:
    assigning the first pre-registration zone identifier to the first group of access points;
    assigning the second pre-registration zone identifier to the second group of access points; and
    assigning the third pre-registration zone identifier to the third group of access points.

11. The method of claim 8, wherein the first pre-registration zone identifier, second pre-registration zone identifier, and the third pre-registration zone identifier are the same zone identifier.

* * * * *